United States Patent
Trenbeath et al.

(12) 
(10) Patent No.: US 6,324,587 B1
(45) Date of Patent: *Nov. 27, 2001

(54) METHOD, COMPUTER PROGRAM PRODUCT, AND DATA STRUCTURE FOR PUBLISHING A DATA OBJECT OVER A STORE AND FORWARD TRANSPORT

(75) Inventors: Brian Trenbeath, Redmond, WA (US); Vilayanur Parameswaran Krishnan, Tucson, AZ (US); William J. Bliss, Medina, WA (US); Siunie Aquawati Sutjahjo; Kevin J. Braun, both of Tucson, AZ (US); David R. Dozier, Plano, TX (US); Eric N. Huber, Tucson, AZ (US)

(73) Assignee: Microsoft Corporation, Redmond, WA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/996,785

(22) Filed: Dec. 23, 1997

(51) Int. Cl.$^7$ ........................................................ G06F 9/00
(52) U.S. Cl. ........................... 709/310; 709/315; 709/206
(58) Field of Search ................................. 709/300–305, 709/206, 201, 218, 205, 241, 246, 303; 707/202, 104; 345/335, 326; 705/26

(56) References Cited

U.S. PATENT DOCUMENTS

| | | | |
|---|---|---|---|
| 5,367,681 | * 11/1994 | Foss et al. | 709/303 |
| 5,406,557 | * 4/1995 | Baudoin . | |
| 5,625,818 | * 4/1997 | Zarmer et al. | 707/104 |
| 5,694,546 | * 12/1997 | Reisman | 705/26 |
| 5,790,790 | * 8/1998 | Smith et al. | 709/206 |

(List continued on next page.)

OTHER PUBLICATIONS

David Crocker, Standard for the format of ARPA Internet Text Messages, 1982.*

*Primary Examiner*—Zarni Maung
(74) *Attorney, Agent, or Firm*—Workman, Nydegger & Seeley

(57) ABSTRACT

A method and computer program product instituting an entirely client-based system for sharing messages and other data objects is provided. Communication between clients occurs over a generic store and forward transport such as the Internet message protocol described in RFC 822 and implemented on the Internet or other wide area network. A message or other data object is originally maintained by a "publication" client that publishes the data object and any modifications thereto to one or more "subscription" clients that will each maintain a copy thereof. As modifications are made by a client (either publication or subscription) to the client copy of the data object, the modified data object is sent, using the store and forward transport, to the publication client to update the data object. Once the data object is updated by the publication client, copies of the modified data object are sent using the store and forward transport to each subscription client so that the subscription client may update the subscription copy. One embodiment of the present invention designates a messaging folder containing one or more data objects as a publication folder (managed by a publication client) that is replicated out to subscription clients over the store and forward transport. The subscription clients each have a corresponding subscription folder wherein the subscription client copies of the data objects are maintained. Any modifications to the data objects are passed to the publication client for verification, replacement in the publication folder, and distribution out to each subscription client for replacement in the corresponding subscription folder. The addition of new data objects or the deletion of existing data objects are handled in like manner through the publication client.

30 Claims, 24 Drawing Sheets

U.S. PATENT DOCUMENTS

| | | | | |
|---|---|---|---|---|
| 5,794,039 | * | 8/1998 | Guck | 709/303 |
| 5,802,314 | * | 9/1998 | Tullis et al. | 709/246 |
| 5,818,447 | * | 10/1998 | Wolf et al. | 345/335 |
| 5,819,032 | * | 10/1998 | DeVries et al. | 709/250 |
| 5,832,514 | * | 11/1998 | Norin et al. | 707/202 |
| 5,850,520 | * | 12/1998 | Griebenow et al. | 709/206 |
| 5,852,436 | * | 12/1998 | Franklin et al. | 345/326 |
| 5,864,684 | * | 1/1999 | Nielsen | 709/206 |
| 5,870,605 | * | 2/1999 | Bracho et al. | 709/302 |
| 5,884,035 | * | 3/1999 | Butman et al. | 709/218 |
| 5,892,909 | * | 4/1999 | Grasso et al. | 709/201 |
| 5,913,032 | * | 6/1999 | Schwartz et al. | 709/503 |
| 6,021,443 | * | 2/2000 | Bracho et al. | 709/241 |

* cited by examiner

MAP TABLE 208

| PUBLICATION ID (GUID) | FOLDER | ROLE | DATA MESSAGE ID | FLAGS |
|---|---|---|---|---|
| PUB 1 | FOLDER A | SUBSCRIBER | ∨ | |
| PUB 2 | FAMILY CONTACTS | SUBSCRIBER | ∨ | |
| PUB 3 | TECHNICAL REVIEW | PUBLISHER | ∨ | |
| ... | ... | ... | ... | |

PERMISSIONS TABLE 213

| SUBSCRIPTION CLIENT ID (GUID) | PUBLICATION ID (GUID) | PERMISSIONS | SUBSCRIBER STATUS | FLAGS |
|---|---|---|---|---|
| SUB 1 | PUB 1 | REVIEWER | ACTIVE | |
| SUB 2 | PUB 1 | EDITOR | ACTIVE | |
| SUB 3 | PUB 1 | EDITOR | PENDING | |
| ... | ... | ... | ... | |

SUBSCRIBERS TABLE 218

| SUBSCRIPTION CLIENT ID (GUID) | DB REFERENCE | VISUAL NAME | E-MAIL ADDRESS | ADDRESS TYPE |
|---|---|---|---|---|
| SUB 1 | ∨ | MR. DOE | JOHN-DOE@XYZ.COM | SMTP |
| SUB 2 | ∨ | BRAD | BIG-CHEESE@LMN.COM | SMTP |
| SUB 3 | ∨ | JANE | JANE-DOE@IVORY.COM | SMTP |
| ... | ... | ... | ... | ... |

SUBMISSION TABLE

| PUBLICATION ID (GUID) | ENTRY # | VERSION # | SUBMISSION ID (GUID) | DATA OBJECT REFERENCE | FLAGS | LAST MOD. TIME |
|---|---|---|---|---|---|---|
| 1 | 1 | 7 | SUBMISSION 1 | ∨ | ∨ | 10:20AM 13 OCT 97 |
| 3 | 3 | 2 | SUBMISSION 2 | ∨ | ∨ | 3:24PM 6 NOV 97 |
| ... | ... | ... | ... | ... | ... | ... |

FIG. 8D

TABLE OF CONTENTS (TOC)

| ENTRY # | VERSION # | STATUS FLAGS | OWNER | DATA OBJECT REFERENCE |
|---|---|---|---|---|
| 1 | 7 | NORMAL | | ∨ |
| 2 | 2 | DELETED | | ∨ |
| 3 | 2 | NORMAL | | ∨ |
| ... | ... | ... | | ... |

FIG. 8E

METHOD, COMPUTER PROGRAM PRODUCT, AND DATA STRUCTURE FOR PUBLISHING A DATA OBJECT OVER A STORE AND FORWARD TRANSPORT

BACKGROUND OF THE INVENTION

1. The Field of the Invention

The field of the present invention is that of sharing data messages and other data objects between different users on different machines over a wide area network, such as the Internet, wherein multiple copies of the data objects exist. Further, any modifications made to the data messages or data objects are propagated outward to each of the replicated copies. More specifically, the present invention deals with data replication over a store and forward protocol, such as Internet email messages according to the RFC 822 specification, that are entirely client-based and do not rely on a particular type of server or server protocol in order to implement data object replication between the different users.

2. Present State of the Art

One of the great benefits of network computing is the ability to share information between different users. While most network solutions allow a single file to be shared or accessed by various clients, a replication of files (or other data objects such as email messages, facsimiles, etc.) over the network allows copies of a file to reside at each client. Indeed, full data replication allows each user to have a copy of a particular data object that may be manipulated and edited at will or may simply be reviewed as a read-only data object. Naturally, it is beneficial, for those items that are edited or otherwise modified, to have such changes replicated to the other copies of the data objects so that all clients or users of the information will have the most current and up-to-date version of a particular data object.

One early example of such replication-based information sharing are Internet news groups that allow users to post and receive messages to a news server. A user will access and browse titles of various news articles found in a database managed by the news server and then download those which are selected. Further, if the user submits an article to be read by others, it will be "posted" to the news server that will in turn distribute the article to other news servers thereby making the article available to all clients by replicating the article to each and every news server. In order to benefit from such a system, each client must communicate with a news server through the particular news server protocol. Note that the actual replication of the news articles is done by the news servers rather than the clients that access the news servers.

Another example of a server-based replication scheme may be seen with many electronic mail (email) servers used as a component in a corporate communications solution. For example, a Microsoft Exchange email server supports the concept of "public" folders that replicate messages out among different individual users. Messages placed in a public folder will be forwarded automatically to others that have access to the public folder so that each user will then have a copy of the message. In this manner, one person may receive a message, copy it to the public folder, and all others will be able to receive the message in their respective Exchange inbox.

While automatic controls may omit the step of requiring a user to manually copy the message to the public folder, the common Exchange server is required in order to replicate the message to the different clients. Furthermore, each client must be an "Exchange" client so that it may communicate with the Exchange email server. Again, much of the actual replication mechanics are performed at the server rather than at the individual clients.

FIG. 1 logically illustrates the client/server model predominate in the prior art for replicating data objects between clients. A plurality of clients 20a–20e are connected to a server 22 in order to communicate one with another. Each client 20a–20e, for example, could be an Exchange client while the server 22 could be an Exchange email server. In this arrangement, all replication is handled by the server 22 and only those clients that can communicate or are compatible with the server 22 may take advantage of any form of replication service. This allows for homogeneous clients to replicate data messages or other data objects and have changes made to the messages automatically reflected to each and every client by the particular server through which they communicate. Again, the clients have no responsibility for the replication service.

A major disadvantage results from the prior art structure in that heterogeneous clients may not participate in replication since compatibility with the particular server performing the replication services is required. This means that an Exchange client could not share replicated email messages with a Novell Groupwise client. Further, even clients of the same type may not be able to share replicated data messages if connected to different servers unless the servers can replicate the messages between themselves.

What is needed is a way to provide client-to-client replication of data objects without regard to the specific mechanics of communication therebetween through servers, special transport layers, protocols with a particular server for replication functionality, etc. In other words, a common protocol may allow communication between the clients that can in turn be used for building a replication scheme controlled by the clients themselves that use the communications protocol solely for delivering messages between the different clients.

SUMMARY AND OBJECTS OF THE INVENTION

It is an object of the present invention to provide data object sharing and change maintenance that is entirely client-based without the need of a specific type of server.

It is another object of the present invention to utilize a store and forward transport for communication so that clients of disparate system types and network connections may participate in a replicating data objects and change maintenance to those data objects.

It is a further object of one embodiment of the present invention to replicate folders of data objects from an originating publication client to one or more subscription clients.

Additional objects and advantages of the invention will be set forth in the description which follows, and in part will be obvious from the description, or may be learned by the practice of the invention. The objects and advantages of the invention may be realized and obtained by means of the instruments and combinations particularly pointed out in the appended claims.

To achieve the foregoing objects, and in accordance with the invention as embodied and broadly described herein a method, computer program product, and data structure for publishing a data object over a store and forward transport is provided. The invention is entirely client-based in that a particular server is not required for performing the replication. The services of servers are only used for communication between the clients, typically under a store and forward arrangement using a standard protocol such as the Internet message protocol described in the RFC 822 specification that is widely implemented today.

The data object may be a file containing the current address, phone number, birthdates, etc. for a number of family members living throughout the country. The original publisher may be the grandparents and the subscribers could be each family where one parent is a child to the grandparents. As each family has a child, moves, or otherwise has reason to update the file, there is a need to send the file to the publisher for distribution to each of the subscribers.

Using the present invention, the publication client would be software running on a personal computer operated by the grandparents and each family would operate subscription client software on computers in their home. Each client would have an email address so that communication between the clients is accomplished using the store and forward transport inherent in Internet communications. A subscription client would submit, though email, the modified family information file to the publication client which would replace the previous copy of the file. Next, the publication client would distribute the modified family information file to each of the subscription clients, again over email. Once each subscription client received the modified file, it would replace the now outdated version of the family information file. At this point, the publication client and all the subscription clients would have the same up-to-date family information file. All modifications are submitted through the publication client that has the database of all subscription clients that are to receive the file.

One embodiment of the present invention works with folders containing messages or other data objects that are replicated or published to subscription clients on a per-folder basis. A subscription invitation is first sent to all the potential subscription clients and is read by a user who then accepts or declines the subscription. In this way, the subscription client will control whether the data objects are received.

If accepted, the subscription client creates a subscription folder and sends a request message to the publication client in order to receive all the data objects for the subscription folder. These data objects are sent using update messages that contain the data objects as attachments.

At this point the subscription folder is current with the publication folder and will receive update messages as the state of the folder changes. Such update messages correspond to new data objects that are added to the publication folder, modified data objects that will supersede the existing version of a particular data object, and instructions or indications to delete an existing data object from the subscription folder.

Whether or not a subscription client may make a particular change (e.g., add a new data object, modify an existing data object, or delete an existing data object) depends on the authority or permissions the subscription client has and upon which subscription client "owns" the particular data object. Generally, the owner is the client that originally submits the data object for publication. The publication client will track the permissions of each subscription client and may change those permissions as appropriate. Since all changes to the data objects made by the subscription clients are funneled through the publication client before being sent to the subscription clients, all permissions and ownership may be verified by the publication client before allowing the change to be published.

Since the implementation of the replication is entirely client based, the information communicated by the messages between clients may be defined in a specification so that any client capable of receiving messages over the store and forward transport may be written to support the present invention. When the Internet protocols are used as the store and forward transport for the communication messages, this opens the way for an extremely large number of clients to participate in client based data object replication.

Even without full compliance to the message communication scheme, a client that can simply receive Internet mail messages, such as a common mail reader, may receive data objects for review as mail messages in the standard inbox. Such non-compliant subscription clients would be read only reviewers of the data objects and would receive a new message for review each time an update is sent out. A compliant subscription client would simply have the data object replaced in the subscription folder so that only the most current version of the data object is ever available in the subscription folder.

These and other objects and features of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which:

FIG. 3A shows clients communicating to a server that in turn communicates to other servers utilizing a standard Internet protocol, such as the messaging protocol defined in RFC 822, while FIG. 3B shows the logical connections of the clients to the Internet or other network supporting the RFC 822 protocol.

FIG. 4A shows a publishing client distributing data objects to each of the subscription clients while FIG. 4B shows how a modified data object from a subscription client is received at the publishing client and then distributed outward to all subscription clients.

FIG. 5A shows the publication client with the original publication folder containing data objects, FIG. 5B shows the publication folder being replicated as a subscription folder containing the data objects at each of the subscription clients, FIG. 5C shows an edited and revised data object being sent to the publication client, FIG. 5D shows the publication client replacing the same data object in the publication folder with the revised data object, and FIG. 5E shows the publication client distributing the revised data object to each of the subscription clients for placement in the corresponding subscription folder.

FIGS. 8A–8E are logical diagrams illustrating certain data structures used to implement the present invention. FIG. 8A is a map table correlating a certain folder with a certain publication ID. FIG. 8B is a permissions table indicating each of the subscription clients for a particular publication including their status and permissions. FIG. 8C is a sub-scribers table indicating all the subscribers found for a particular publication including a visual name used for displaying purposes, an e-mail address and e-mail protocol, and a reference into a database, such as an address book, for acquiring information. FIG. 8D is a submission table used by a subscription client to keep track of submissions made to the publishing client. FIG. 8E is a table of contents (TOC) structure that is kept in the publication or subscription folder having an entry for each data object contained in the folder and including information regarding the data object such as its version number, status, etc.

FIG. 13A represents the steps taken during the processing of an update message when the conflict is first identified whereas FIG. 13B illustrates the steps taken to resolve the conflict requiring interaction with the user of the publication client.

DETAILED DESCRIPTION OF THE PREFERRED EMBODIMENTS

Figure 1:
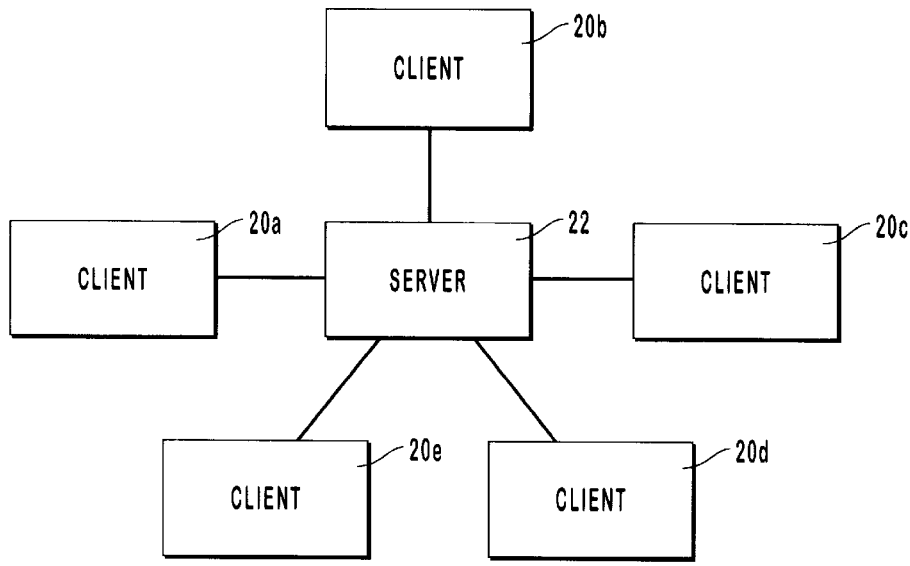
FIG. 1 is a block diagram illustrating the client server model predominately used in data replication between different clients in the prior art.

As used herein, the term "store and forward transport" refers to a communication scheme between client computers attached over a heterogeneous network, such as the Internet. One important example of such a transport is described for Internet mail messages as described in RFC 822. Such a store and forward transport specifies the protocol for delivering messages between different clients regardless of the servers and other routing computers that convey the message during transit. Such a transport is asynchronous in that the two end points of communication, the respective clients, do not have any direct contact nor is there any guarantee of timing between a message being sent and a message being received (other than a general time-out value).

A store and forward message, therefore, is a message having a predefined format and sent over a store and forward transport. Such messages may include attachments or other ways of associating different types of data therewith. In this manner, a particular data object may be included in a store and forward message and later be removed from that message during processing.

A store and forward message, also referred to as a data message or message, may have particular data fields associated therewith known as properties. A property value would be the particular value of the data field and would convey certain information about the particular message. For example, a certain type of property could have different values that could be used to determine the nature or characteristics of a message.

As used herein, the term "data object," refers to any discretely formatted data that is separately cognizable by a client. Examples of data objects include, but are not limited to, data messages, such as email, files of all sorts, including text, images, etc., facsimiles, software objects, etc. Throughout this application, data messages, such as email messages, and files will be used as part of one embodiment of the present invention. It will be understood by those skilled in the art that any form of data object may be used.

As used herein, the term "publication client" refers to a software component that is able to manage data objects for publication to other clients. A "subscription client" will receive updates to particular data objects reflecting modifications made thereto from the publication client.

As used herein, the term "publication folder" refers to the common organizational entity for viewing one or more data objects as commonly found in operating systems and messaging applications, such as Microsoft Exchange or Microsoft Outlook. A "publication folder" is a particular folder wherein the contents (i.e., the messages or other data objects contained therein) are to be published or distributed out to the various subscription clients so that replicated copies exist at the subscription clients. A "subscription folder" is a folder that has therein copies of data objects published by a publication client from a publication folder. A client without any reference to a publication client or subscription client will typically be generic to either type of client.

Figure 2:
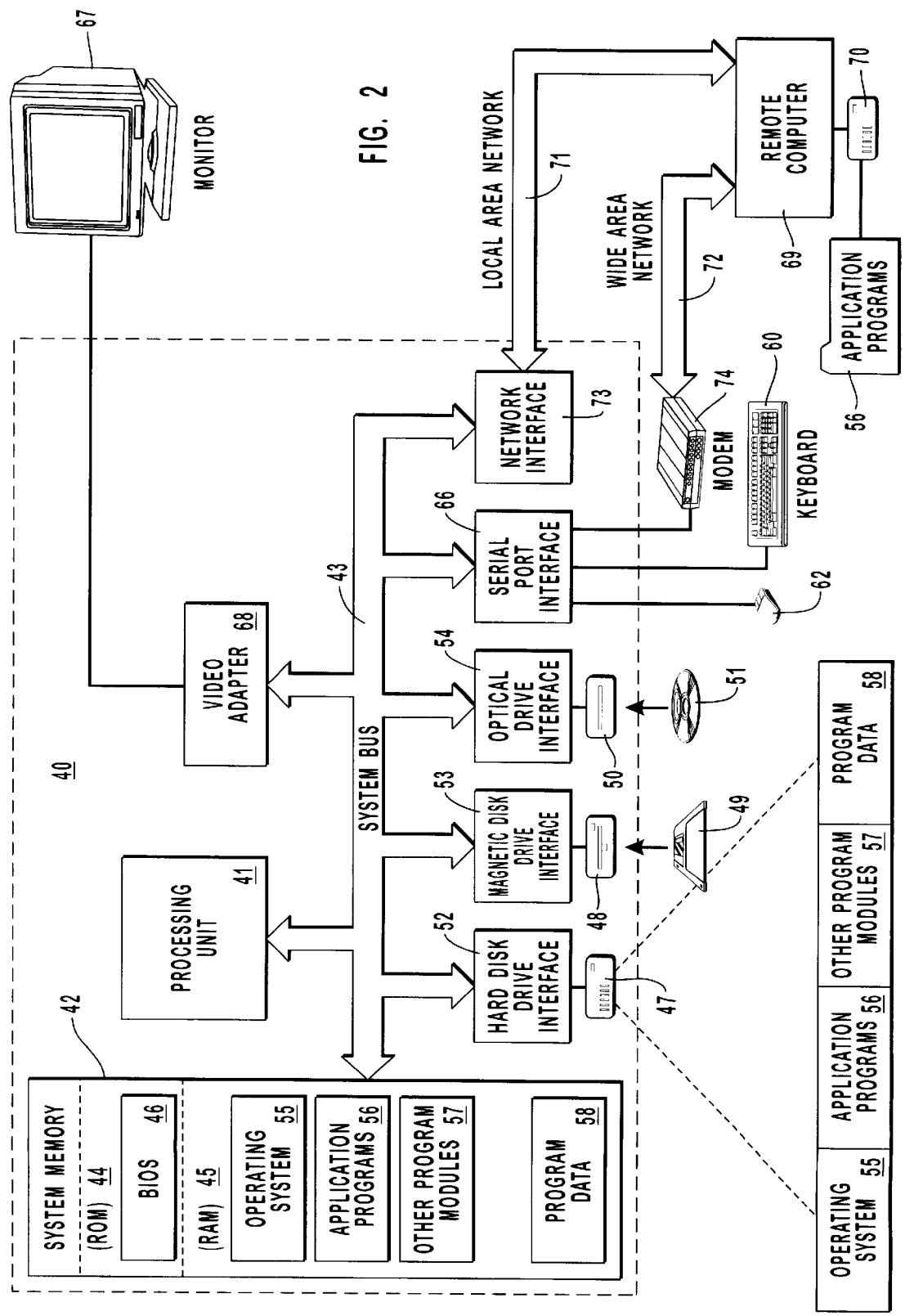
FIG. 2 is a block diagram of an exemplary system for implementing the invention that includes a general purpose computing device in the form of a conventional personal computer suitable for being a client system.

FIG. 2 and the following discussion are intended to provide a brief, general description of a suitable computing environment in which the invention may be implemented. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 2, an exemplary system for implementing the invention includes a general purpose computing device in the form of a conventional personal computer 40, including a processing unit 41, a system memory 42, and a system bus 43 that couples various system components including the system memory to the processing unit 41. The system bus 43 may be any of several types of bus structures including a memory bus or memory controller, a peripheral bus, and a local bus using any of a variety of bus architectures. The system memory includes read only memory (ROM) 44 and random access memory (RAM) 45. A basic input/output system 46 (BIOS), containing the basic routines that helps to transfer information between elements within the personal computer 40, such as during start-up, is stored in ROM 44. The personal computer 40 further includes a hard disk drive 47 for reading from and writing to a hard disk, not shown, a magnetic disk drive 48 for reading from or writing to a removable magnetic disk 49, and an optical disk drive 50 for reading from or writing to removable optical disk 51 such as a CD ROM or other optical media. The hard disk drive 47, magnetic disk drive 48, and optical disk drive 50 are connected to the system bus 43 by a hard disk drive interface 52, a magnetic disk drive-interface 53, and an optical drive interface 54, respectively. The drives and their associated computer-readable media provide nonvolatile storage of computer readable instructions, data structures, program modules and other data for the personal computer 40. Although the exemplary environment described herein employs a hard disk, a removable magnetic disk 49 and a removable optical disk 51, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROM), and the like, may also be used in the exemplary operating environment.

A number of program modules may be stored on the hard disk, magnetic disk 49, optical disk 51, ROM 44 or RAM 45, including an operating system 55, one or more application programs 56, other program modules 57, and program data 58. A user may enter commands and information into the personal computer 40 through input devices such as a keyboard 60 and pointing device 62. Other input devices (not shown) may include a microphone, joystick, game pad, satellite dish, scanner, or the like. These and other input devices are often connected to the processing unit 41 through a serial port interface 66 that is coupled to the system bus, but may be connected by other interfaces, such as a parallel port, game port or a universal serial bus (USB). A monitor 67 or other type of display device is also connected to the system bus 43 via an interface, such as a video adapter 68. In addition to the monitor, personal computers typically include other peripheral output devices (not shown), such as speakers and printers.

The personal computer 40 may operate in a networked environment using logical connections to one or more remote computers, such as a remote computer 69. The remote computer 69 may be another personal computer, a server, a router, a network PC, a peer device or other common network node, and typically includes many or all of the elements described above relative to the personal computer 40, although only a memory storage device 70 has been illustrated in FIG. 2. The logical connections depicted in FIG. 2 include a local area network (LAN) 71 and a wide area network (WAN) 72. Such networking environments are commonplace in offices enterprise-wide computer networks, intranets and the Internet.

When used in a LAN networking environment, the personal computer 40 is connected to the local network 71 through a network or adapter 73. When used in a WAN networking environment, the personal computer 40 typically includes a modem 74 or other means for establishing communications over the wide area network 72, such as the Internet. The modem 74, which may be internal or external, is connected to the system bus 43 via the serial port interface 66. In a networked environment, program modules depicted relative to the personal computer 40, or portions thereof, may be stored in the remote memory storage device. It will be appreciated that the network connections shown are exemplary and other means of establishing a communications link between the computers may be used.

Figure 3A:
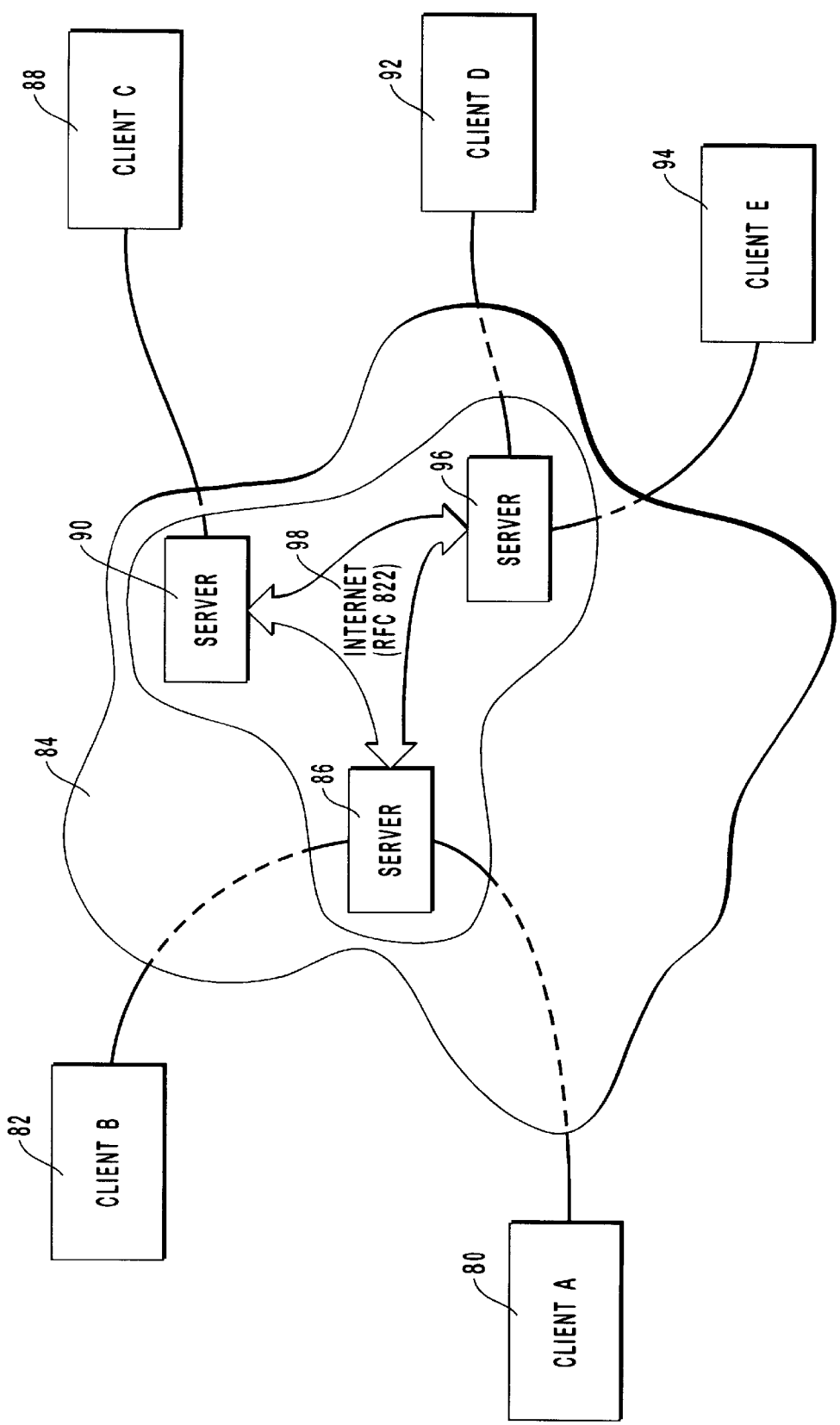
FIGS. 3A and 3B are logical diagrams showing the operation of the underlying hardware and software for communicating between the clients. More specifically.

Referring now to FIG. 3A, a logical diagram of various clients communicating through a store and forward transport is shown. Client A 80 and client B 82 are able to hook into the wide area network 84 by means of logically connecting to server 86. The wide area network 84 could be the Internet or an intranet or any other such wide area network. In like manner, client C 88 has access to the wide area network 84 through server 90 and client D 92 and client E 94 have access through server 96.

The respective servers 86, 90, and 96 can communicate one with another directly or indirectly using a store and forward transport, such as the Internet mail message format described in RFC 822. The actual clients may not have the capability to communicate with any other entity besides the respective server to which they are connected but through the wide area network 98 and the ability of the servers to communicate.

Figure 3B:
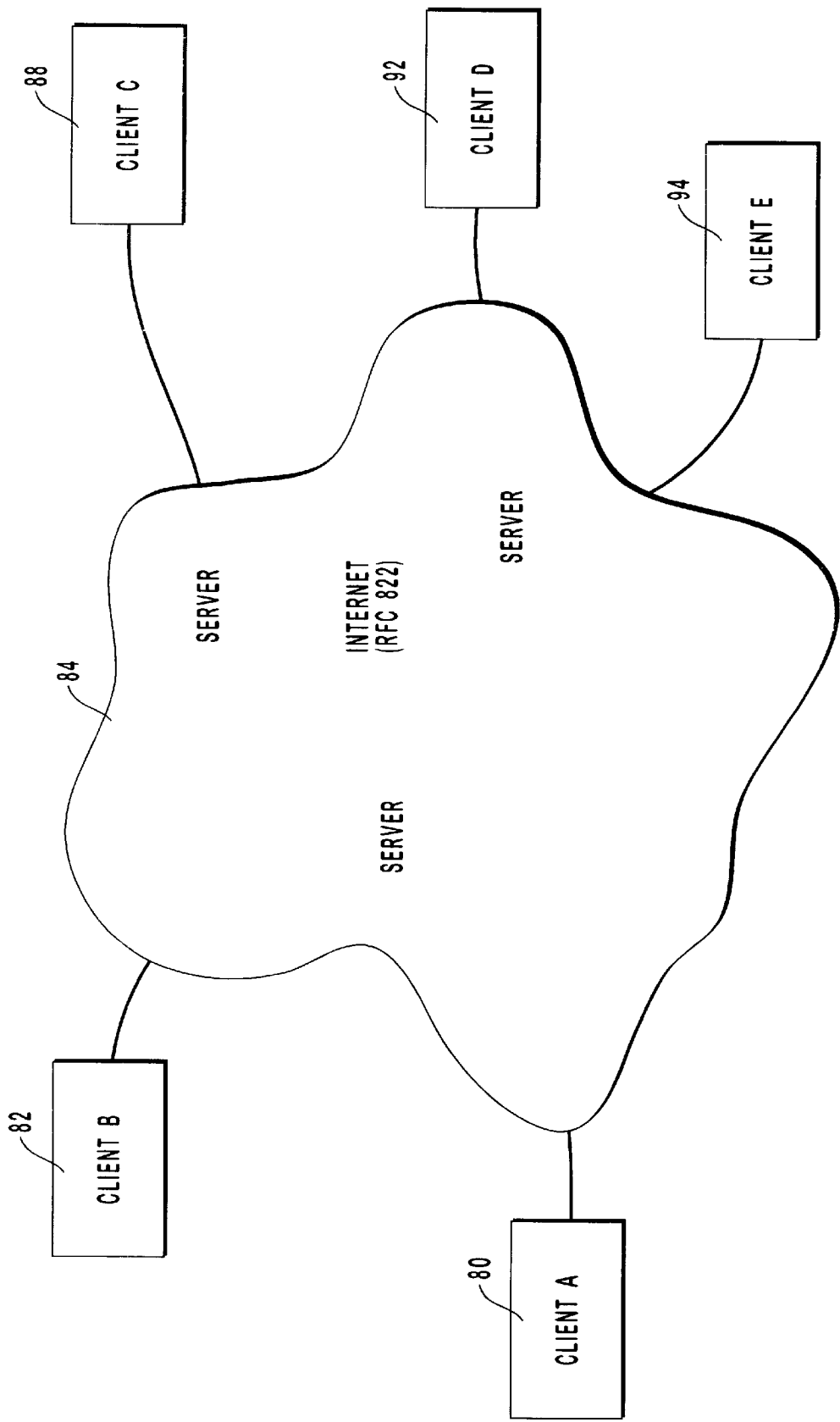

The net effect of such an arrangement allows any client to communicate with any other client through the store and forward transport as shown in FIG. 3B. This allows each client, regardless of the server to which it is connected, the ability to send messages to each other client over the wide area network 84 using the store and forward message transport 98. In this manner, clients may be given the ability to control replication as will be shown hereafter without regard to the type of server to which they may be connected or the client's ability to directly communicate with another client.

Figure 4A:
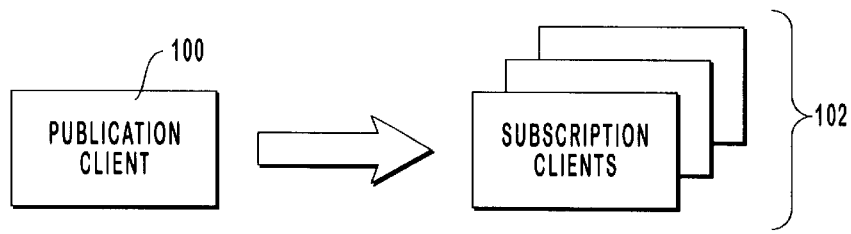
FIGS. 4A and 4B are logical diagrams illustrating the basic communication paradigm between the different clients.
Figure 4B:
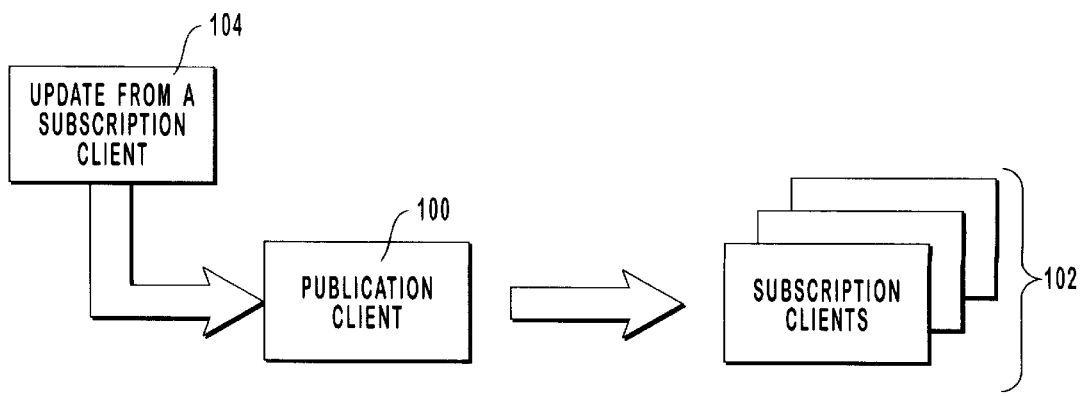

FIGS. 4A and 4B are logical models depicting the basic paradigm used amongst the clients for publishing or replicating a data object amongst the clients. Referring to FIG. 4A, one client is a publication client 100 which will "mail" a copy of a data object to each of the clients listed as part of the plurality of subscription clients 102 in order to "publish" that data object. Each client, whether chosen as the publication client 100 or one of the subscription clients 102, can be any client having the ability to communicate one with another over a storing forward transport and have the appropriate software running thereon. For example, any of the clients shown in FIG. 3B could be used as a publication client or one of the subscription clients.

If changes are made by one of the subscription clients 102 to a particular data object, an update message 104 is sent from the particular subscription client to the publishing client 100. The publishing client 100, in turn, will make the particular adjustment to the original or publication copy of the data object and distribute the data object out to each of the subscription clients 102. The update message 104 may include instructions, such as a delete command to remove a particular data object at the publication client or a modify command for modifying a particular data object. The preferred way of representing a modification to an existing data object or the creation of a new data object is to include the actual data object in its modified form. In one embodiment explained hereafter in more detail, e-mail messages are sent between publication clients and subscription clients with actual data objects appended thereto as attachments for communicating the modifications.

FIGS. 5A–5E show the publication of a folder containing a number of data objects from a publication client to a number of subscription clients. Furthermore, an example is shown of how a modification made by one of the subscription clients is sent to the publication client for distribution amongst all of the subscription clients.

Figure 5A:
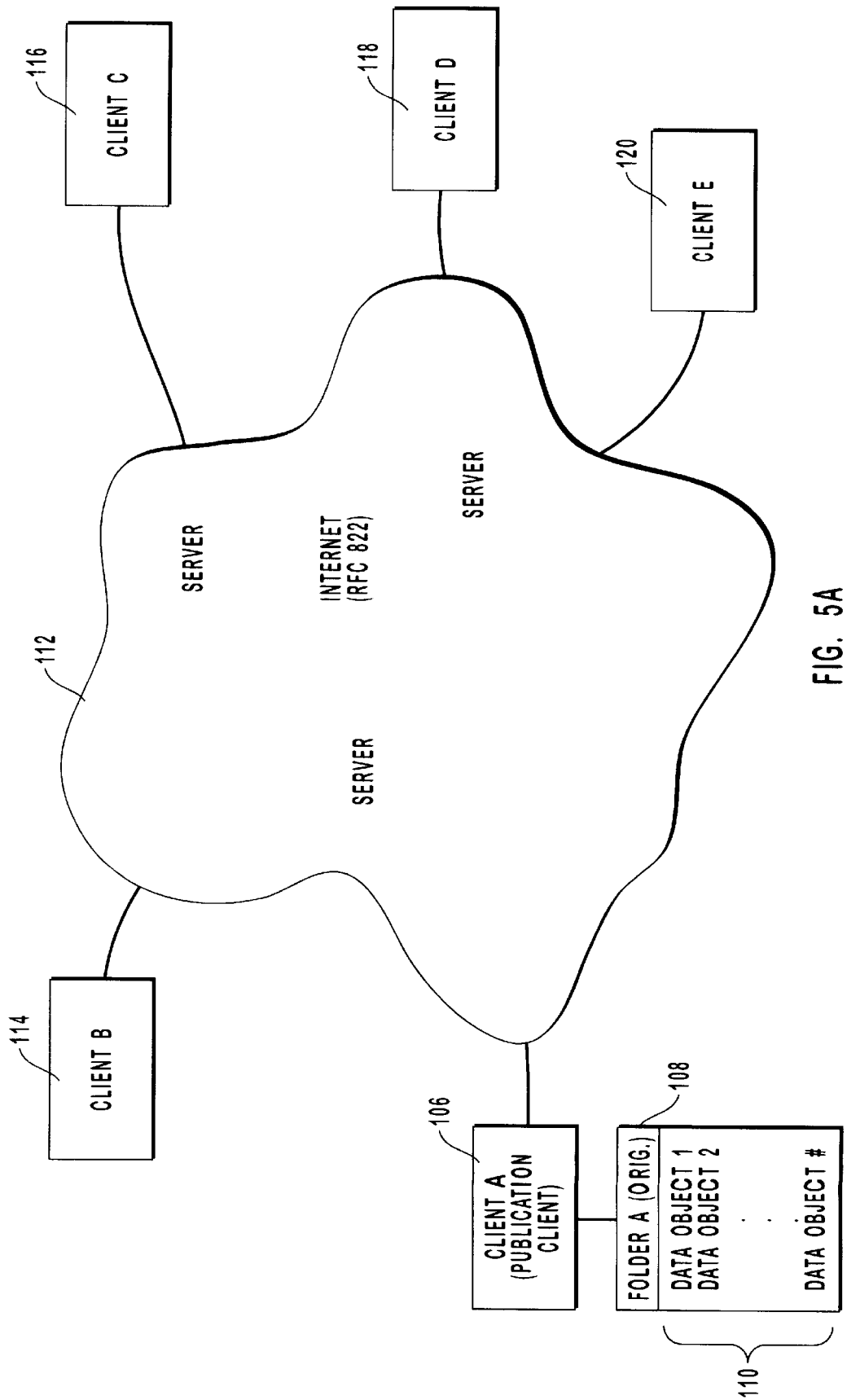
FIGS. 5A–5E are a series of logical diagrams showing how a publication client will publish the contents of a publication folder to a number of different subscription clients and receive a revised data object from one subscription client that is in turn distributed to the other subscription clients after being received at the publication client.

Referring to FIG. 5A, client A 106 is a publication client having a publication folder A 108 containing a plurality of data objects 110. Note that the publication client A 106 is connected to the Internet 112, or other suitable wide area network. Furthermore, publication client A 106 may communicate with client B 114, client C 116, client D 118, and client E 120 by logical address over a store and forward transport. Over the Internet 112, this store and forward transport would be the messaging protocol established by RFC 822.

The publication client A 106 will have publication client software running thereon in order to manage the publication folder A 108 or any other folders and data objects that are to be published. The operation of the publication software will be explained in greater detail in connection with the discussion of the flowcharts shown in FIGS. 9–13.

Figure 5B:
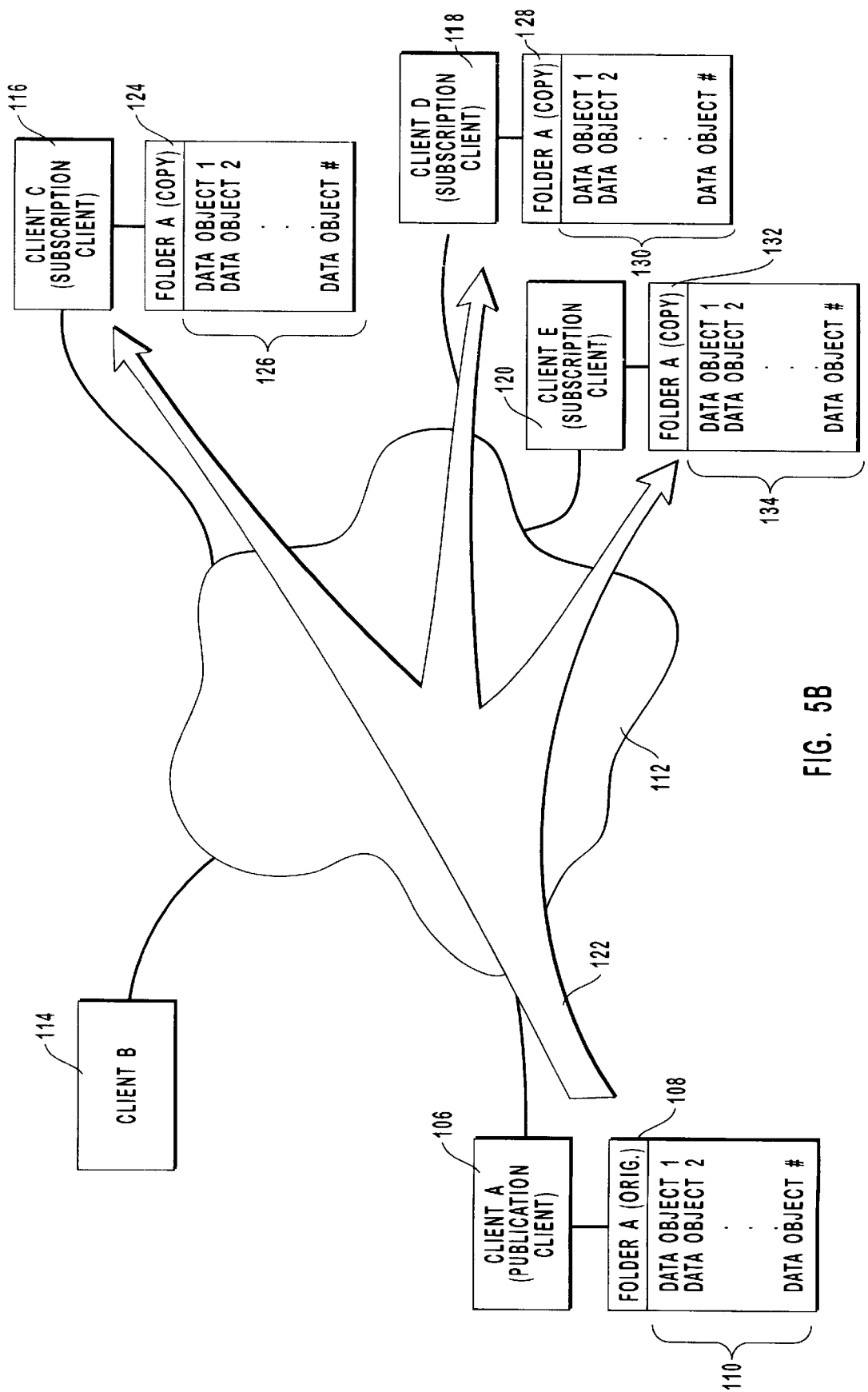

Once folder A 108 has been selected for publication, it will be distributed to one or more subscription clients as shown in FIG. 5B. The publication folder A 108 is distributed as shown by multi-headed arrow 122 to subscription client C 116 as subscription folder A 124 having a plurality of data objects 126 that are exact copies of the plurality of the data objects 110 of the publication folder 108. In like manner, subscription client D 118 also has a subscription folder A 128 with a plurality of data objects 130 and subscription client E 120 has a subscription folder 132 with a plurality of data objects 134.

Each of the respective subscription clients, client C 116, client D 118, and client E 120, will have subscription client software running thereon that contain the data structures and instructions for creating the subscription folders and to receive messages from the publishing client A 106. Furthermore, the software will manage other events and information necessary to maintain the subscription copies of the respective data objects. Details of how such software operates with respect to one embodiment of the present invention will be explained hereafter in more detail in connection with flowcharts shown in FIGS. 14–19.

Figure 5C:
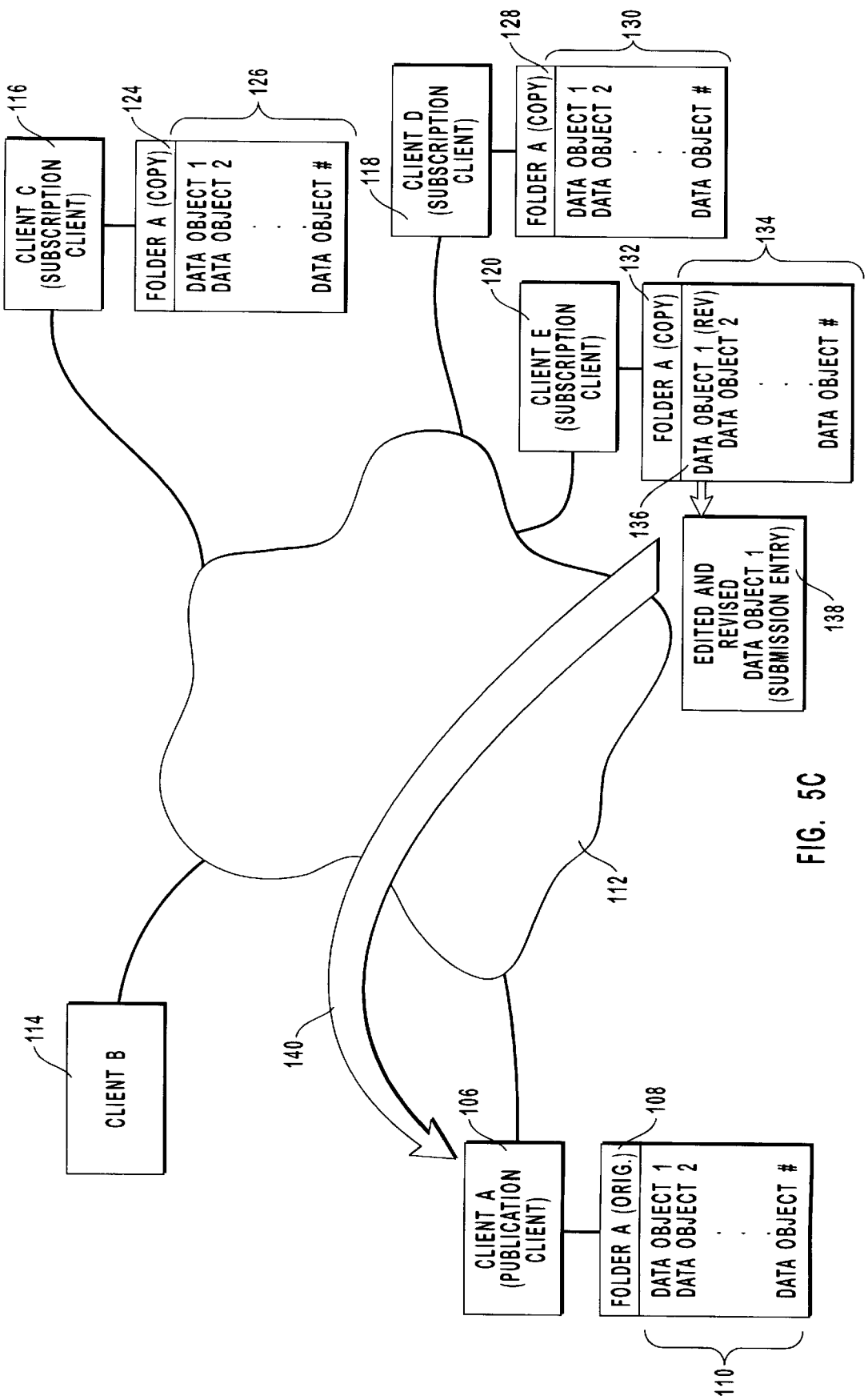

Referring now to FIG. 5C, the modification of subscription copy of a data object followed by sending the revised data object to the publication client is shown. Suppose that subscription client E 120 edits and modifies data object 1 136. The revised data object 1 138 is stored in the subscription folder A 132 as a submitted item and is also sent to the publication client A 106 as represented by arrow 140. The original data object 1 136 will be replaced by the revised data object 1 138 as indicated. This embodiment modifies the subscription copy of a data object directly and sends the revised data object to a publication client for distribution to only the remaining subscription clients. Other embodiments may leave the original data object unmodified until receiving the modified data object back from the publication client. This and other implementation specific details, variations, or performance enhancements will be considered within the scope of the claimed invention.

Figure 5D:
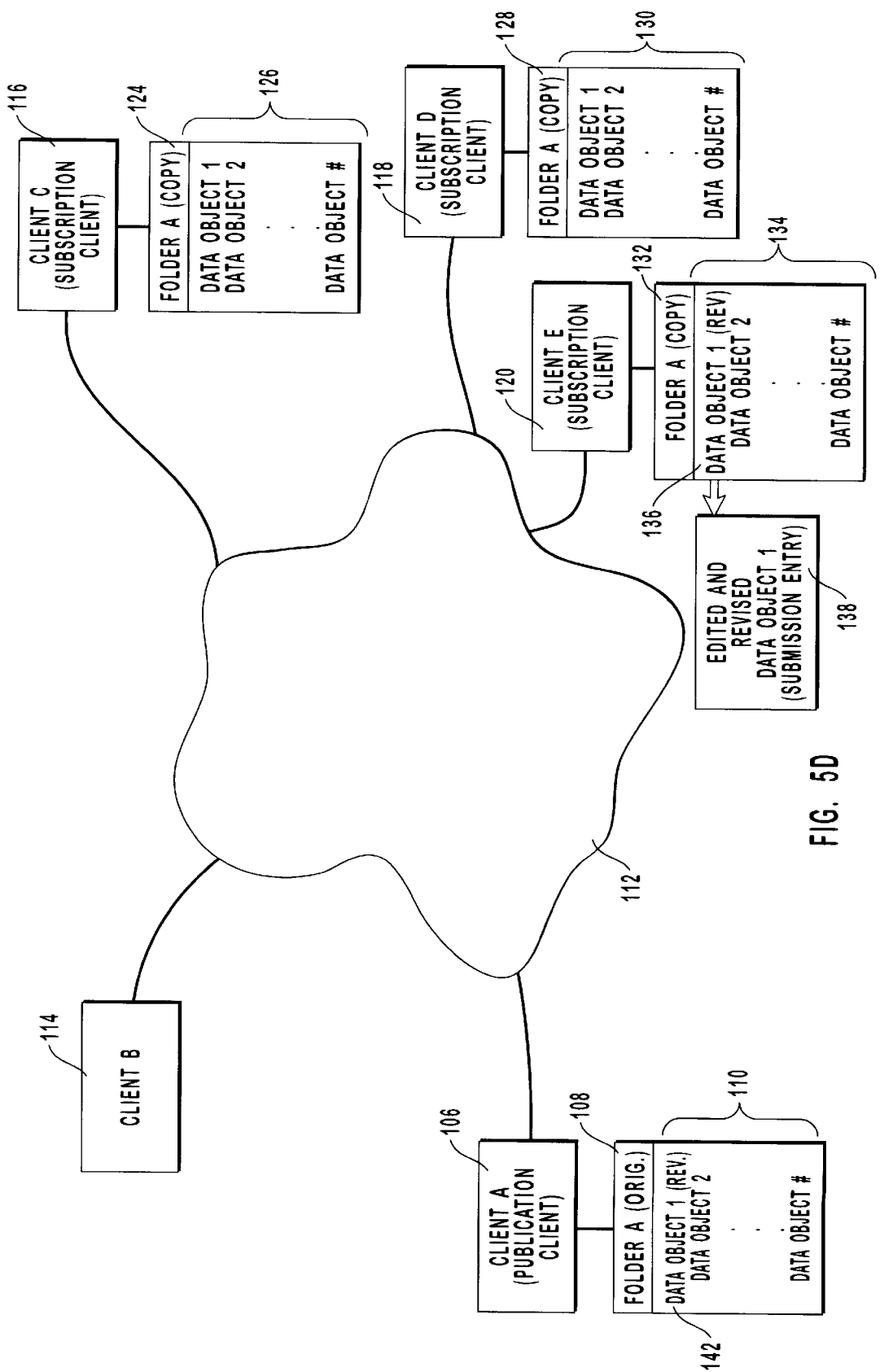

Once the publication client 106 receives the revised data object 1 138, it will replace the data object 1 previously found in folder A 108 with the revised data object 1 142 as shown in FIG. 5D. Since the revised data object 1 142 came by way of a message over the Internet 112, the publication client A 106 will strip or extract the data object 142 from the message as it is either attached or incorporated therein. At this point, the publication folder A 108 is current and up-to-date and it is necessary to bring each subscription client's folder A current.

Figure 5E:
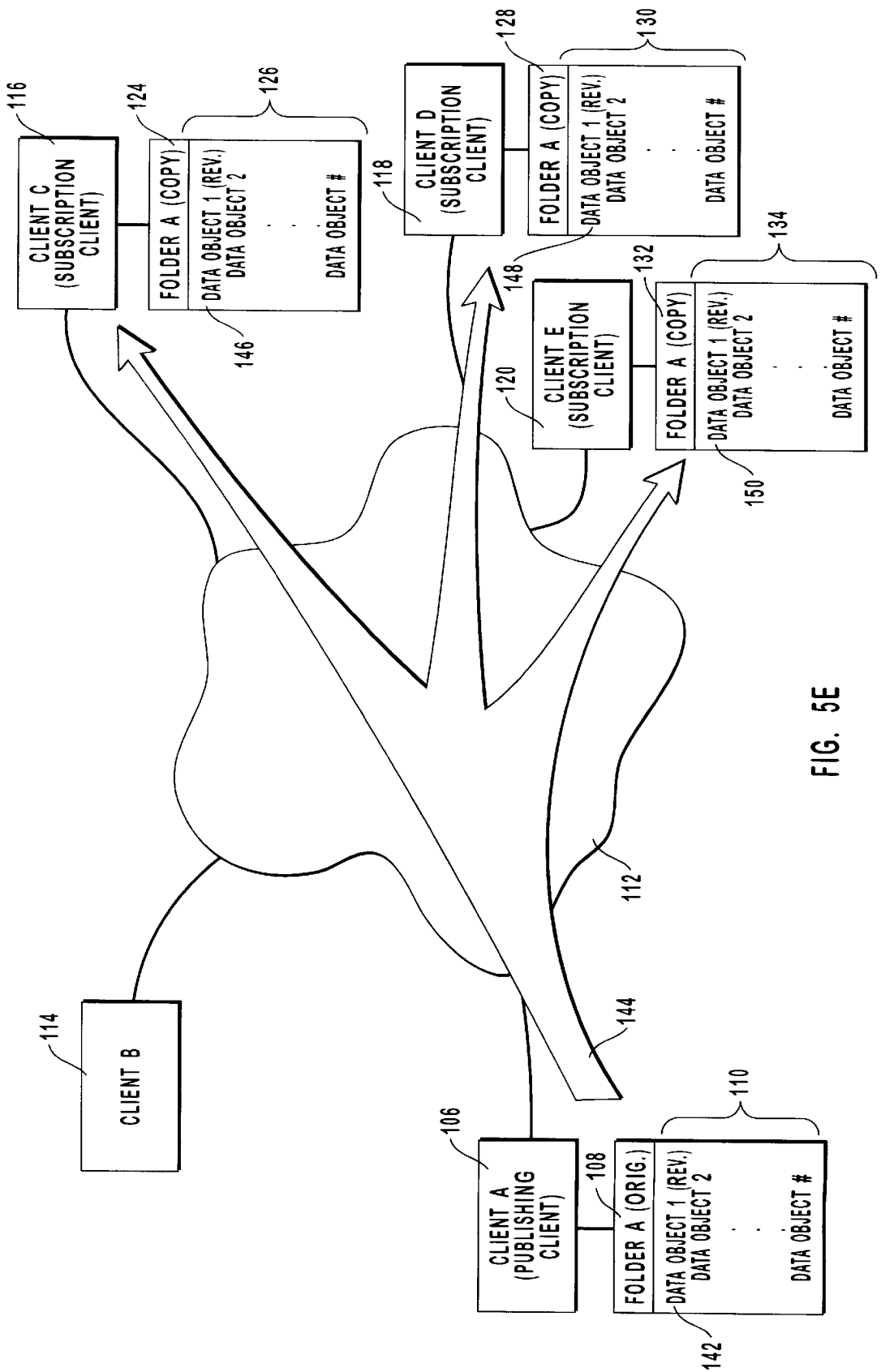

After placing the revised data object 1 142 in the publication folder 108, the publication client A 106 will distribute copies of the revised data object 1 142 out to each subscription client as shown in FIG. 5E. The multi-headed arrow 144 represents the transmission and receipt of an Internet mail message containing the revised data object as an attachment (or otherwise incorporated therein) as received by subscription client C 116, subscription client D 118, and subscription client E 120. Each respective subscription client will extract the revised data object 1 from the mail message and place it in the respective subscription folder. For example, subscription client C 116 will place the revised data object 146 into subscription folder A 124, and subscription client D 118 will place revised data object 148 into subscription folder A 128.

Note that subscription client E 120 was the subscription client that originally submitted the revised data object 1 and had already placed a revised data object 1 150 into the folder A 132. When the message is received from the publication client 106, the subscription client E 120 will delete the submission copy or entry for the revised data object 1 150.

Alternatively, other embodiments may not change the copy found in the subscription folder 132 until it receives the revised data object 1 150 from the publication client A 106. One potential benefit for only changing a subscription client's subscription folder in response to a message from a publication client is that this may more readily allow the publication client to handle all conflict resolution between modifications made to same data object. Revision conflicts may occur when another client revises data object I before receiving the revised data object 1 initially revised by Client E 120. The conflict resolution process for one embodiment of the present invention that reflects revisions immediately in the client folder will be explained hereafter in more detail in connection with the flowcharts shown in FIGS. 13A and 13B.

The publication client may also monitor and control whether an operation can be performed by a particular client for security and data integrity purposes. This additional benefit of only allowing a subscription client to change contents of a subscription folder in response to a message from a publication client results because it gives the publication client the ability to centrally control all activity with respect to what happens at each subscription client's subscription folder.

At this point, each data object 1 in each subscription folder A managed by each respective subscription client will contain the exact same information. While the update process has been demonstrated with an existing data object that has been revised, the process occurs for the deletion of existing data objects or the addition of new data objects. To delete an existing data object, the data object would be identified along with a delete indication in the message to the publication client from one of the subscription clients. To add a new data object, the new data object would be attached as part of the message and an indication would be made that it is new.

Because of the entirely client-based nature of the present invention, any particular client may be both a publication client and a subscription client. For example, a particular client may be a publication client for folders that originate on that particular client while it may be subscription client for folders (and the contained data objects) to folders published by other clients. In one embodiment of the present invention, the same code modules are shared between subscription clients and publication clients so that the functionality to operate as either type of client is inherent if the code is available at all.

Additionally, different levels of subscription can be made available depending on the capabilities of the subscription clients. Since messages can be sent over a standard store and forward transport, such as the Internet messaging format defined by RFC 822, any existing client compatible with the standardized format can receive messages. In other words, as long as the data object is an Internet message, can be readily converted to an Internet message format, or in some way associated with an Internet message, it may be sent to that particular client. Such a client could be a standard Internet mail reader program and may not have capabilities for submitting modifications to a data object due to lack of compliance to a higher level protocol for publication and subscription. It is therefore said to be a non-compliant client and will simply receive messages in its normal inbox with all other messages each time a particular data object in the publication folder is updated.

Compliant clients, on the other hand, are fully enabled for the capabilities of the present invention by being written to fully comprehend the publication/subscription protocol. They are enabled to automatically interpret an incoming update message, extract the data object from the message, and place the data object into a subscription folder by copying over an older version of the data object. Therefore, an up-to-date data object is automatically maintained in the subscription folder without any explicit action on the part of the user.

Figure 6:
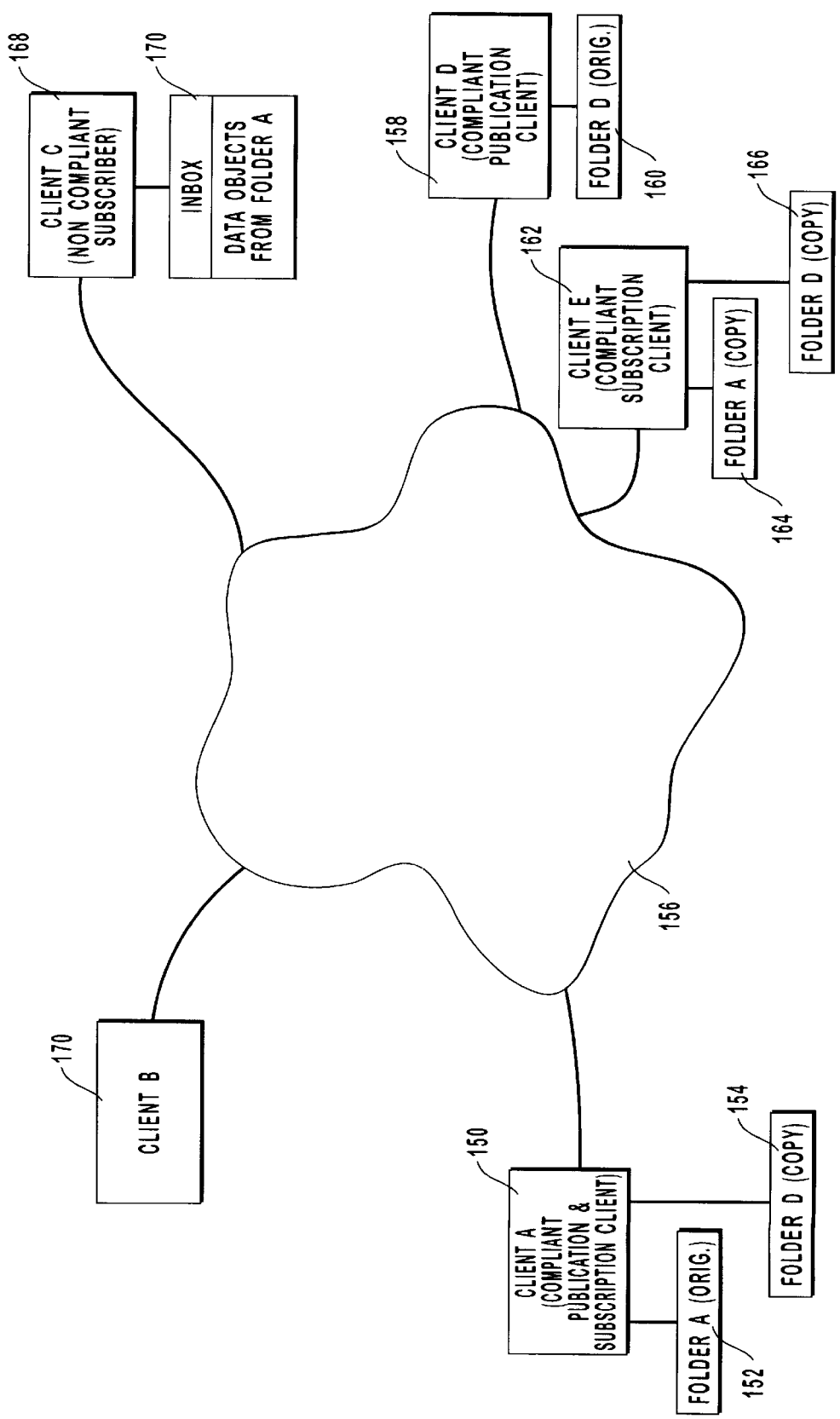
FIG. 6 is a logical diagram showing how clients may be a publication client for one or more data folder, a subscription client for one or more data folders, a publication client for some data folders and a subscription client for other data folders, or a non-compliant review only client.

FIG. 6 is a logical drawing showing a system having a compliant publication client, a compliant subscription client, a combined compliant publication/subscription client, and a non-compliant subscription client. Client A 150 is a compliant publication/subscription client and has a publication folder A 152 and a subscription folder D 154. Client D 158 is a compliant publication client that publishes the contents of folder D 160. Client E 162 is a compliant subscription client that maintains subscription folder A 164 and subscription folder D 166. Client C 168 is an example of a non-compliant subscription client that will receive messages having data objects attached thereto in the user's inbox 170. As explained previously, each client is able to communicate one with another over a store and forward transport 156, such as the Internet messaging protocol described in RFC 822 over the worldwide Internet.

The subscription folder D 154 as managed by client A 150 will receive updates and data objects published by client D 158, a compliant publication client. Client D 158 will publish folder D 160 to one or more subscription clients and as shown in FIG. 6, one is client A 150 and another is E 162. Note that client E 162 is a compliant subscription client and has two folders, subscription folder A 164 and subscription folder D 166 that it maintains. Depending on the client E 162 permissions, changes may be made to the data objects in the respective subscription folder A 164 and subscription folder D 166, submitted to the respective publication client, and reflected amongst all subscription clients since the client E is fully compliant with the publication/subscription protocol.

Client C 168 is a non-compliant subscription client to the data objects of publication folder A 152 managed by the publication client A 150. The original set of data objects from publication folder A as well as any modified data objects that may be received by the publication client A 150 will be sent to the non-compliant subscription client C 168 as standard Internet messages that will be received in inbox 170 of the non-compliant subscription client C 168. Such data objects and subsequent modification messages would be received by the non-compliant subscription client C 168 in the same manner as the client would normal email messages. Finally, note that many clients such as client B 170, may not participate at all in the publication/subscription of messages and other data objects.

One embodiment of the present invention has been developed as an extension to the architecture developed in connection with Microsoft Exchange. Therefore, the particular facilities of the Exchange messaging system will be illustrated and discussed as part of this particular implementation and are not to be construed as limiting.

Figure 7:
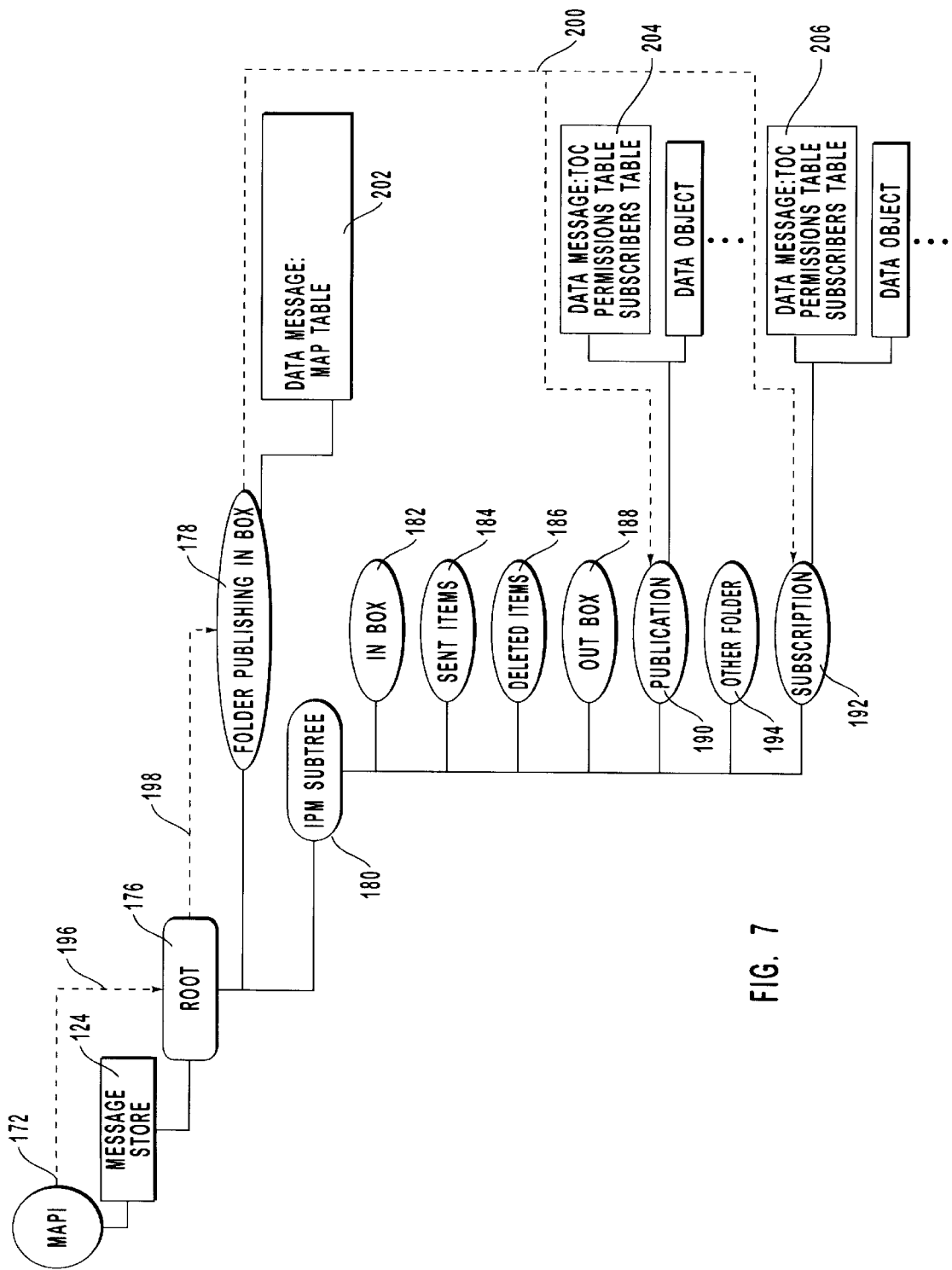
FIG. 7 is a logical diagram of an Exchange message store having a folder publishing inbox for implementing the present invention and shows the logical path of messages arriving into the message store. The incoming messages are used to eventually distribute data objects into the subscription and publication folders as well as for other processing.

Referring now to FIG. 7, a logical diagram is shown illustrating the constructs of an Exchange message store and message routing through the system into a folder publishing inbox where the actual data objects are extracted and placed into the appropriate folders. The origination point is the Messaging Application Programming Interface (MAPI) 172 wherein a message store 174 depends thereon having a folder directory beginning with a root folder 176. The root folder 176 has a number of subfolders, some of which are not viewed by an actual user such as the folder publishing inbox 178, and others that are. Folders that contain messages destined to be viewed through a browser or other means by a end user are collectively grouped under the interpersonal message (IPM) subtree 180.

The IPM subtree 180 contains the standard folders normally viewed by users including the inbox 182, the sent items folder 184, the deleted items folder 186, and the outbox 188. Additionally, in FIG. 7 there is a publication folder 190, a subscription folder 192, and another folder, "other folder" 194, that have been created.

A publication/subscription message entering into the Exchange system will be automatically routed, based on message type, to the folder publishing inbox 178 as represented by dashed arrows 196 and 198. The routing methods will vary depending on the specific implementation. Examples of routing methods include Exchange Default Receive Rules and Microsoft Rules Wizard. A monitoring thread of the folder publishing extension will read messages on demand from the folder publishing inbox 178 and take appropriate action based on the message and state of the system. Eventually, data objects are extracted from incoming messages since they are attachments thereto and are sent to the appropriate publication folder 190 or subscription folder 192 as represented by the dashed line 200. Within the folder publishing inbox 178, the publication folder 190, and subscription folder 192 are special data messages having certain data structures contained therein that are used in maintaining the publication and subscription folders. The actual data structures will be explained in more detail hereafter in the discussion surrounding FIG. 8.

The folder publishing inbox has a data message 202 that contains a map table data structure. Each publication or subscription folder contains a data message containing a table of contents (TOC) data structure, a permissions table, and a subscribers table. For example, the publication folder 190 has a data message 204 containing a TOC for the contents of the publication folder 190, a permissions table for each of the subscription clients participating in that publication, and a subscribers table listing all of the subscribers associated with the subscription clients. In like manner, the subscription folder 192 has a data message 206 containing a TOC for the subscription folder 192, and a permissions table and subscribers table pertinent to that subscription. This is maintained only for symmetry purposes and is redundant for the subscriber. The TOC contains a list of the data objects contained in the respective folder as will be shown hereafter in more detail.

Referring now to FIG. 8A, a map table is shown which maps a publication ID 208 to a corresponding folder 209 so that given a particular publication ID, the appropriate folder may be identified. Note that this allows a subscription folder to have a different name and location in the subscription client message store then is found in the original publication client message store. A globally unique identifier (GUID) is used for the publication ID 208 and will be determined by the publication client and passed to a subscription client through a message over the store and forward transport during new subscription processing. The folder 209 is identified by name or reference depending on implementation. Additionally, the role 210 of the publication as found on this particular client, such as a subscriber or publisher, is identified. A data message ID field 211 is used to identify or reference the data message containing the other data structures for a given publication (e.g., TOC, permissions table, subscribers table, and submission table) found in the respective folder indicated by the folder field 211. Finally, status flags 212 are associated with each entry in the map table that are used by the respective clients for managing the publications as explained hereafter.

A "publication" is a publication folder that is to be replicated to one or more subscription clients. A "subscription" refers to the publication from the perspective of the subscription client. The process of initiating a publication by a publication client and accepting a subscription to that publication by a subscription client will be explained in more detail hereafter in discussion surrounding FIG. 12 and FIG. 19.

Referring now to FIG. 8B, a permissions table is shown that identifies different subscription clients for a particular publication and their permissions for operating on the data objects of the subscription. A permissions table may contain a variety of information, icluding but not limited to, a subscription client ID 213 to identify each subscription client, a publication ID 214 to identify and associate a publication with the subscription client, certain permissions 215 that describe how a subscription client may operate on the folder and data objects contained therein, subscriber status 216, and status flags 217 that are used by the clients managing the subscription. Note that the subscription client ID 213 and publication ID 214 can easily be implemented as GUIDs. Essentially, the permissions table contains the individual permissions that the subscription client has in the publication as well as the subscription client's status at any point in time. Table 1 below describes the different kinds of permissions available and an associated description.

TABLE 1

Permissions

| Role/Permissions | Description |
| --- | --- |
| Editor | An editor has total access to all data objects in a particular publication. Therefore, an editor can create new data objects, and read, edit, or delete any existing data object in the publication folder. |
| Author | An author may create new data objects as well as read all data objects in the publication folder. An author, however, may only edit and delete data objects in the publication folder that are owned by that particular author. |
| Contributor | A contributor may create new data objects and read all data objects in the publication. A contributor cannot edit or delete any data objects from the publication folder. |
| Reviewer | A reviewer may only read data objects in the publication folder. Consequently, a reviewer cannot add new data objects nor edit or delete any existing data objects in the publication folder. |
| Non-compliant Reviewer | Since a non-compliant reviewer is receiving all data objects as attachments to messages that are received in the standard inbox, there is not the subscription folder associated therewith. Like any other reviewer, a non-compliant reviewer will simply be able to read the data objects as they are received in the inbox and cannot add new data objects at an existing or delete existing data objects. Furthermore, a non-compliant reviewer differs from a compliant reviewer in that a new message is received and separately handled by the user for each modification made to a data object in the publication folder while the compliant reviewer will replace the particular data object in the subscription folder with the revised data object. |

Referring to FIG. 8C, a subscribers table is shown that lists information regarding the subscribers that are associated with a subscription client. A subscribers table may contain a variety of information, including but not limited to, a subscription client ID 218, a reference 219 that can be used to access a database, such as an address book, of subscriber information, a visual name 220 that can be used when the subscriber name is to be displayed, address 221 where messages can be sent over a store and forward transport, and an address type 222 that identifies the format or type of e-mail address and transport protocol, such as SMTP or X400. Note that much of the information is optional in that it can be obtained by reference through use of the reference 219 into a more complete database. As shown, the reference 219 is used to access a database of information to establish the other fields when the publication is originally set up. Those skilled in the art will note that other embodiments may use the reference 219 for periodically updating the other fields as necessary even after the initial set up.

Referring to FIG. 8D, a submission table is shown that is used by a subscription client when submitting a modified data object to the publication client. An entry is made in the submission table upon sending the modified data object to the publication client and removed when the publication client sends the revised data object back to the subscription client during the normal course of processing. Such update processing will be explained hereafter in greater detail in the discussion surrounding FIGS. 10, 16, and 18.

Each entry on the submission table may contain, but is not limited to, the following fields: a publication ID 223 to identify the publication to which the table entry pertains, an entry number 224 used as a reference to indicate which data object within the publication has been submitted, a version number 226 that tells which version of the data object is sent having the modifications, a submission ID 228 for identifying the particular submission to the publication client, a data object reference 229 so that the actual data object may be found or identified, status flags 230 that are used by the client in managing the subscription, and a last modification time 231 that tracks when the data object of the submission was last modified. Typically, the publication ID 223 and the submission item ID 228 are implemented as GUIDs.

The entry number 224 is an integer that uniquely identifies a particular data object within the publication folder. The entry number 224 is assigned when a data object is initially made part of the publication either by being in a folder selected for publication or later added to the publication folder. The highest value for the entry number 224 is tracked and new data objects will receive the next higher number. When a data object is deleted, the entry number is not typically reused.

The version number 226 will only be incremented by the publication client and is used to track the current state of a data object. If a modified data object is received by a publication client, it will reference the version number of the data objects upon which the modification was made. The modified data object will be assigned the incremented version number once accepted by the publication client and placed in the publication folder. The version number may indicate how many modifications have been made to the data object.

Referring now to FIG. 8D, the TOC data structure is shown in more detail. There is one TOC for each publication folder or subscription folder that lists the data objects contained therein. Each row or entry of the TOC table may include but is not limited to the following fields: An entry number 232, a version number 234, status flags 236, the data object owner 238, and a data object reference 240. Again, the entry number 232 is a way to numerically reference the data object while the version number 234 indicates the current version of a particular data object. The status flags 236 will indicate whether a data object has been deleted amongst other status. The field indicating the owner 238 is used in verifying permissions to assure that a particular subscription client has the requisite authority to edit or delete a particular data object.

In order to coordinate activities between a publication client and one or more subscription clients, messages are passed back and forth over a store and forward transport. In one embodiment of the present invention using Microsoft Exchange messaging services, there is the ability to send different types of messages that can be recognized by the respective publication or subscription clients who are fully compliant with applications/subscription protocol. There are update messages that are sent from a subscription client to a publication client, and from a publication client to a subscription client. Additionally, there are request messages sent from a subscription client to a publication client and synchronization state or syncstate messages sent from a publication client to a subscription client.

Each message type has associated with it certain data fields or properties associated therewith that contain control information that will be used by the respective publication client or subscription client. Furthermore, a data object, if applicable to the message, will be included as an attachment. Note that in some implementations all the properties may be grouped together and included as an attachment to the message or a data object may be incorporated into the body of the message. Those skilled in the art will recognize that many variations exist in terms of organizing the control information and data objects for transport in a message format over a store and forward transport.

An update message acts as a wrapper for a data object being distributed out to the various subscription clients from the publication client by including the data object as an attachment. Additionally, subscription clients will include a modified data object as an attachment to an update message when submitting modifications to a publication client. Furthermore, a delete indication may also be sent by means of the update message in order to indicate the deletion of a particular data object. Below, in Table 2, is a list of properties that may be included in an update message and their appropriate description. Note that other properties may also be used depending on the implementation.

TABLE 2

Update Message Properties

| Properties | Description |
|---|---|
| Entry Number | This property specifies the entry number of the attached or referenced data object that was assigned to the data object upon creation or initial cataloging of the publication client and is used as a reference. |
| Publisher Flag | The publisher flags are used to indicate miscellaneous types of information. One flag will indicate whether or not the update message is being sent by the publication client or the subscription client. |
| Owner ID | This field specifies the subscription client ID of the owner of the data object during a create or modify operation. If the update message is from the publication client, this is the owner ID for the data object attached to the update message. The net effect is that the subscription client owning the data object will have access to the message and data object according to his permissions while non-owners will have read-only access. If the update message is from a subscription client, the owner ID is set to match the subscription client ID of the subscription client if subscription client is requesting or retaining ownership, otherwise the property will be null. |
| Publication ID | This property indicates the publication ID to which the update message pertains. |
| Submission ID | The submission ID is a GUID associated with an update message when an attached data object is created or modified. The subscription client uses the GUID to reference the submission before the publication client has assigned an actual entry number for a new message. |

TABLE 2-continued

Update Message Properties

| Properties | Description |
| --- | --- |
| Subscription client ID | It is not valid if the update message originates from a publication client. |
| Version Number | Version number tracks the current version of a data object. Only the publication client is able to increment this number. |

Figure 10:
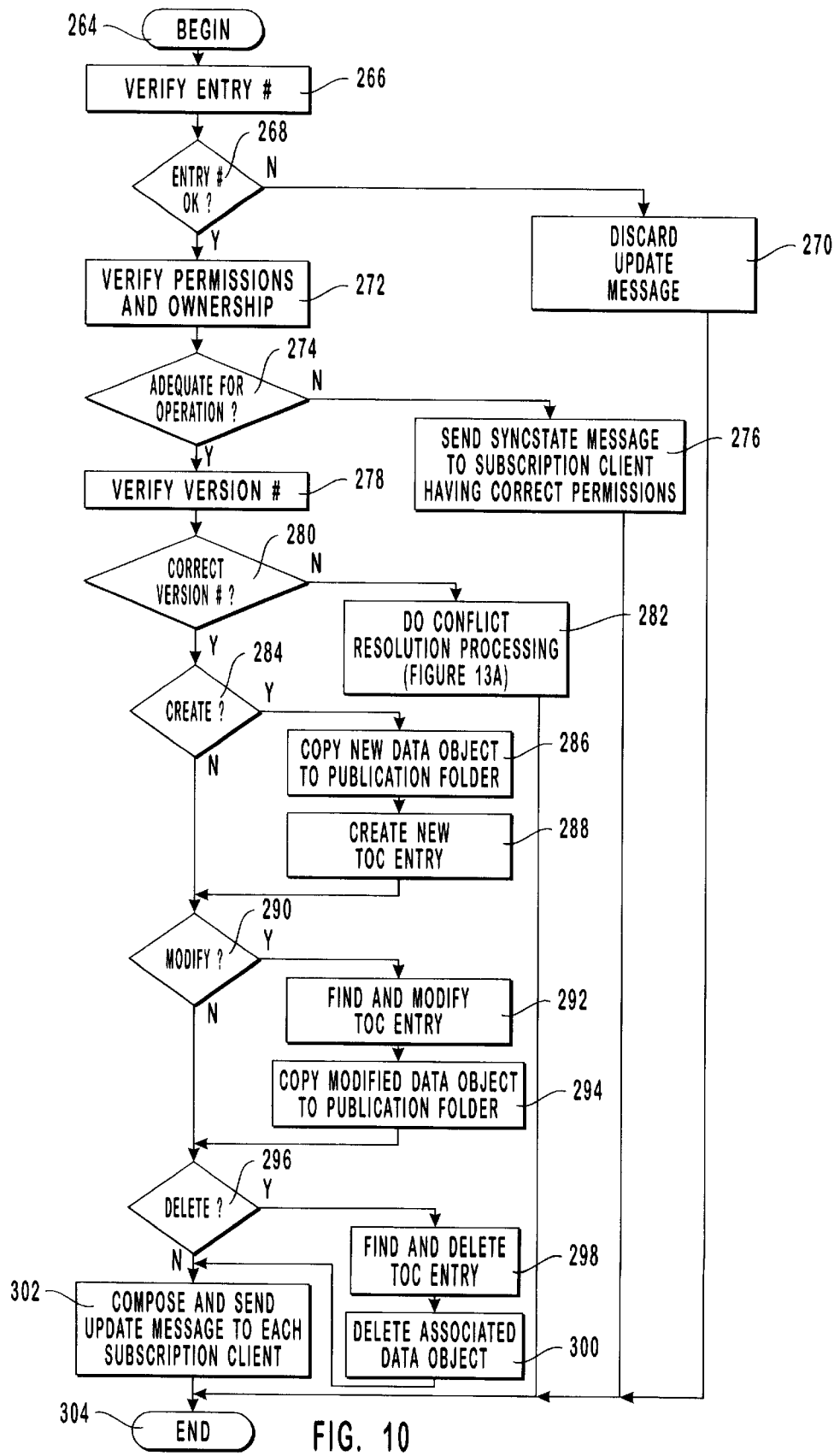
FIG. 10 is a flow chart showing the processing steps taken by a publishing client in order to process an update message received from a subscription client that may contain a modified data object.

The update message processing for the publication is explained in more detail hereafter in the discussion surrounding FIG. 10. Likewise, the update message processing for a subscription client is explained in greater detail hereafter in the discussion surrounding FIG. 16.

A request message is sent from a subscription client to a publication client in order to request a certain type of action. Typically, a specific request type is given that will determine the action taken by the publication client. Some common request types are a request for activation of a subscription, a request for cancellation of a subscription, a request for missing data objects, and a request for a synchronization message on the publication folder. Each of these request types will be explained in more detail as part of the discussion surrounding FIG. 11. Below, in Table 3, are some of the properties that may be associated with a request message.

TABLE 3

Request Message Properties

| Property | Description |
| --- | --- |
| Missing Objects | The missing data objects property indicates data objects needed by the requesting subscription client. The publication client will send the latest version of the requested data objects to the subscription client in response to the request message. This process is explained from the publication client side in more detail in the discussion surrounding FIG. 11 and with the subscription client in the discussion surrounding FIG. 17 and FIG. 19. |
| Publication ID | Publication ID is a GUID indicating the publication folder for which the request is made. |
| Request Type | Request type is a set of flags that indicate the nature of processing associated with the request. Some sample types are the activation of a new request, the cancellation of an active subscription, a request for missing messages, and a request for synchronization with the publication client. Note that in some cases, more than one type may be processed in the same request message (e.g., requesting to activate a subscription and re-questing missing messages in order to create the subscription folder). |
| Subscription client ID | Indicates the subscription client ID of the subscription client. |

A synchronization state or syncstate message is sent from the publication client to a subscription client based on either a predetermined criteria or a specific subscription client request. The purpose of the syncstate message is to send enough information to the subscription client so that it may verify that it has the most current and up-to-date version of all the data objects in the publication folder. Typically, this is done by attaching the publication client's TOC with the syncstate message.

Figure 17:
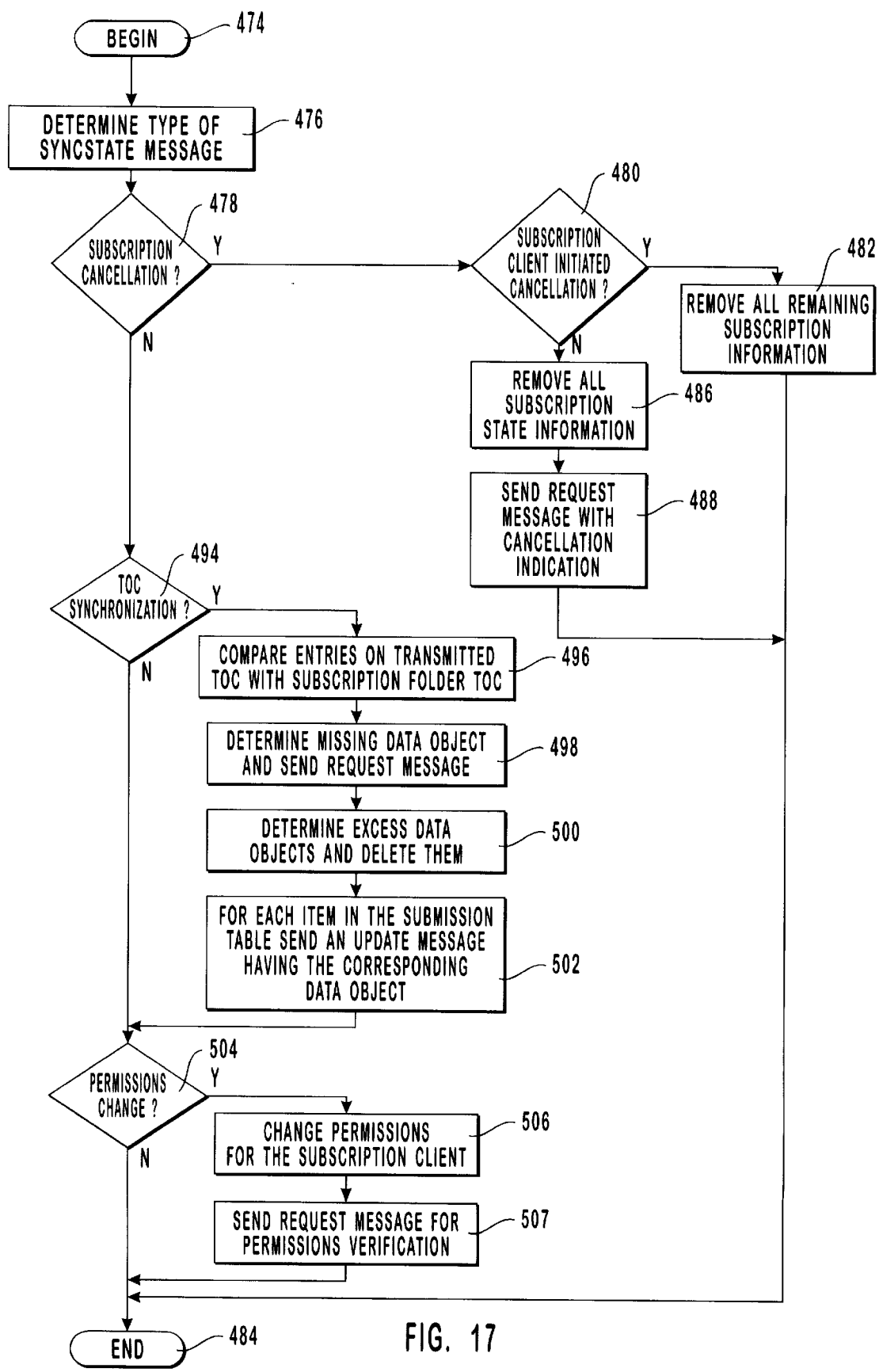
FIG. 17 is a flow chart illustrating the processing steps taken by a subscription client when processing a synchronization state or syncstate message received from a publication client.

A more detailed description of the syncstate processing by a subscription client is explained in the discussion surrounding FIG. 17 hereafter. Below, in Table 4, is a non-exhaustive list of potential properties for the syncstate message.

TABLE 4

SyncState Message Properties

| Property | Description |
| --- | --- |
| SyncState Flags | SyncState flags convey miscellaneous information including type of syncstate message presented in whether the message has been sent in response to update processing. |
| Max Entry Number | This integer number indicates the highest entry number used by the publication folder. Note that entry numbers for data objects that have been deleted are not reused but simply become inactive. |
| Permissions | A setting indicating the permissions for the subscription client receiving the syncstate message. |
| Publication ID | Specifies the publication folder through a GUID. |
| Subscription State | Indicates the state of the subscription, namely: active, inactive, or pending. |
| Transmitted TOC | This is the TOC of the publication client that contains the most up-to-date information on all the data objects stored therein. |

In order to understand how publication clients and subscription clients work and interact one with another, FIGS. 9 through 19 are presented. FIGS. 9 through 13A and 13B present the publication client processing while FIGS. 10 through 19 present the subscription client processing. The interaction between the publication and subscription clients is done through processing the messages described above.

Figure 9:
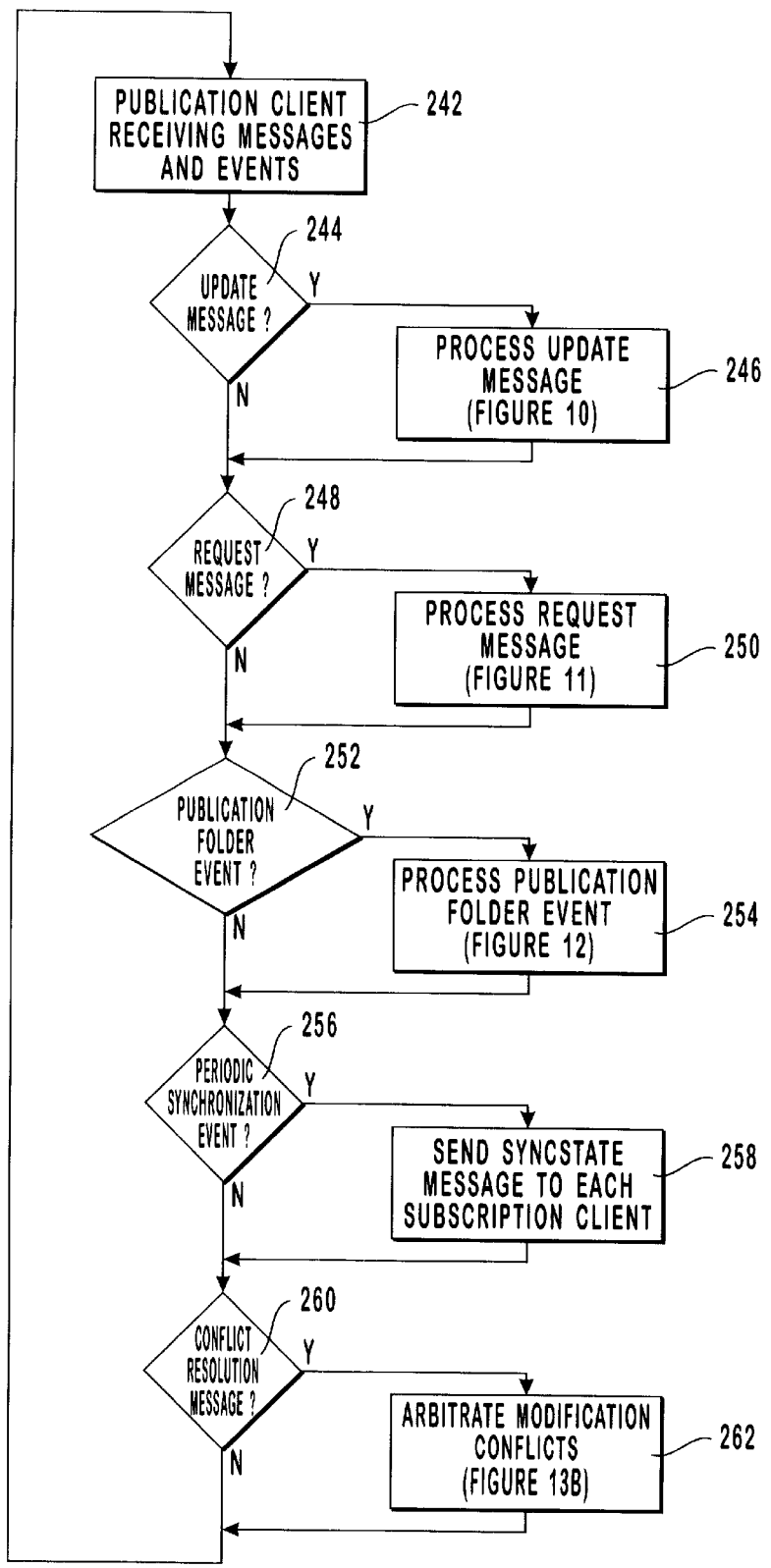
FIG. 9 is a high-level flow chart illustrating the basic processing steps taken by a publication client as it receives data messages over the store and forward transport and internal status events.

Referring now to FIG. 9, a high-level flow chart showing the basic processing steps for the publication client is shown. This publication client is a thread that will monitor the folder publishing inbox 178 of FIG. 7 as well as other internal events that may be initiated by a user of the client software. The publication client receives messages and events at step 242. If an update message is detected at step 244, then the update message is processed at step 246. An update message is received by a publication client from a subscription client and typically has a new data object associated therewith or an existing data object that has been modified and needs to be placed into the publication folder and thereafter distributed out to all of the subscription clients. The update message processing will be explained in greater detail hereafter in the discussion surrounding FIG. 10.

If a request message is detected at step 248, then request message processing takes place at step 250. A request message is received from a subscription client and generally contains a list of data objects that the subscription client needs in order to make the subscription folder up-to-date with the publication folder. Also, other requests such as cancellation of an active subscription or change in permissions may be made. The request message processing will be explained in greater detail hereafter in the discussion surrounding FIG. 11.

If a publication folder event is detected at step 252, then publication folder event processing occurs at step 254. Publication folder events include such things as creating a new publication folder, adding a subscription client, and altering permissions for operating on folders as well as ownership of the individual data objects. The publication folder event processing will be described in greater detail hereafter surrounding the discussion of FIG. 12.

If a periodic synchronization event is detected at step 256, then a syncstate message is sent to each subscription client at step 258. Because a store and forward transport is sometimes unreliable, it is important for the publication client to periodically generate a synchronization event that will allow all subscription clients to synchronize the contents of each subscription folder with the contents of the publication folder. On occasion, messages are lost in transit between publication clients and subscription clients. The processing of the syncstate message by a subscription client will be explained in more detail hereafter surrounding the discussion of FIG. 17.

If a conflict resolution message is detected at step 260, then the publication client will arbitrate modification conflicts at step 262. Since subscription clients act independently of one another, and there is no synchronous transfer of messages between the subscription clients and the publication clients, two or more separate subscription clients may submit a modified data object having different modifications to the same base version. A conflict situation is detected during the update message processing (FIG. 10) and is explained in detail hereafter in the discussion surrounding 13A and 13B.

Referring now to FIG. 10, the processing steps for processing an update message by the publication client are shown. Beginning at step 264, the entry number property on the update message is verified at step 266. Essentially, the entry number found in the update message is matched against an entry number in the publication folder TOC. If a new message is enclosed with the update message and the entry number matches an already existing entry number in the publication folder TOC, then the entry number is invalid for the create since a data object having that entry number already exists. Likewise, if a subscription client modifies a data object in the publication folder and the entry number doesn't match the entry number of any non-deleted publication folder TOC entry, then no data object can be located corresponding to the entry number and the entry number is again invalid. In like manner, if a subscription client deletes a data object contained in the publication folder and no matching entry can be found amongst the non-deleted publication folder TOC entries, the entry number is invalid.

If any entry number is found to be invalid at step 268 as explained previously, the update message, including any attached data object, is discarded at step 270.

At step 272, permissions and ownership of the subscription client for doing the indicated operation on the attached data object are assessed or verified. The subscription client's permission information is acquired from the subscription client table data structure. Because some permissions only allow deletion or modification on data objects that are owned by a particular subscription client, the subscription ID is also compared with the ownership ID found in the appropriate entry in the publication folder TOC.

If the permissions and ownership are not adequate for the desired operation, as explained previously and determined at step 274, a syncstate message is sent to the subscription client having the correct permissions for that subscription client at step 276. When the subscription client receives the syncstate message, it will be able to adjust its permissions accordingly so that future impermissible updates will not be submitted.

The version number property found in the update message is compared to the version number as it is found in the publication folder TOC at step 278. If the version number found in the update message does not match the version number found in the publication folder TOC for the designated data object as determined at step 280, then a modification conflict has been detected and conflict resolution processing is done at step 282. The mechanics of the conflict detection processing done during update message processing will be discussed more fulling in connection the discussion surrounding FIG. 13A hereafter. The actual resolution of the conflict is explained in the discussion surrounding FIG. 13B.

The mismatch in version numbers indicates a conflict because a modified data object being submitted to a publication client should have the same version number as the same data object found in the publication folder. Since the subscription folder where the modified data object originated should be an up-to-date copy of the publication folder, the version number of the data objects should also be the same.

If it is determined that the update message is creating a new data object for publication at step 284, the new data object is copied into the publication folder at step 286. Next, a new publication folder TOC entry is created at step 288. In order to create the new TOC entry, the highest current entry number will be incremented to create the new entry number and the version number will be set to 1 as this is the initial version. The owner field of the publication folder TOC entry will be filled with the owner ID property found in the update message.

If the update message contains a modified data object as an attachment as determined at step 290, the existing entry for that data object in the TOC will be found and modified at step 292. The TOC entry is modified by incrementing the version number representing the modified data object that has been received in the update message and that replaces the previous version in the publication folder.

Next, the modified data object is copied over the existing data object in the publication folder at step 294. Storage of previous versions of a particular data object is not currently supported and only the latest version should exist in the publication folder. Those skilled in the art will recognize that storage of previous versions of data objects could be implemented should the occasion require.

If the update is for a delete operation as determined at step 296, there will be no attached data object. Using the information from the update message, the TOC entry corresponding to the data object is found in the publication folder TOC and marked as deleted at step 298. Note that the TOC entry will remain in the publication folder TOC even after deleted, and the delete will be indicated by the status flags found therein. Finally, the associated data object indicated in the update message is deleted from the publication folder at step 300.

At this point, the publication folder is up-to-date with the results of the update message received from a particular subscription client. In order to reflect the changes made to the publication folder, an update message is composed and sent to each subscription client at step 302 before processing ends at step 304. Note that the processing steps shown in FIG. 10 represent the detailed description of the processing steps found in step 246 of FIG. 9.

The update message will include a copy of the new or modified data object if the update is a create or modification update or will have instructions for a delete if it is a delete update. Once each subscription client receives and processes the update message, each subscription folder should reflect the state of the publication folder. Subscription client processing of an update message is explained in more detail hereafter in connection with the discussion of FIG. 16.

Figure 11:
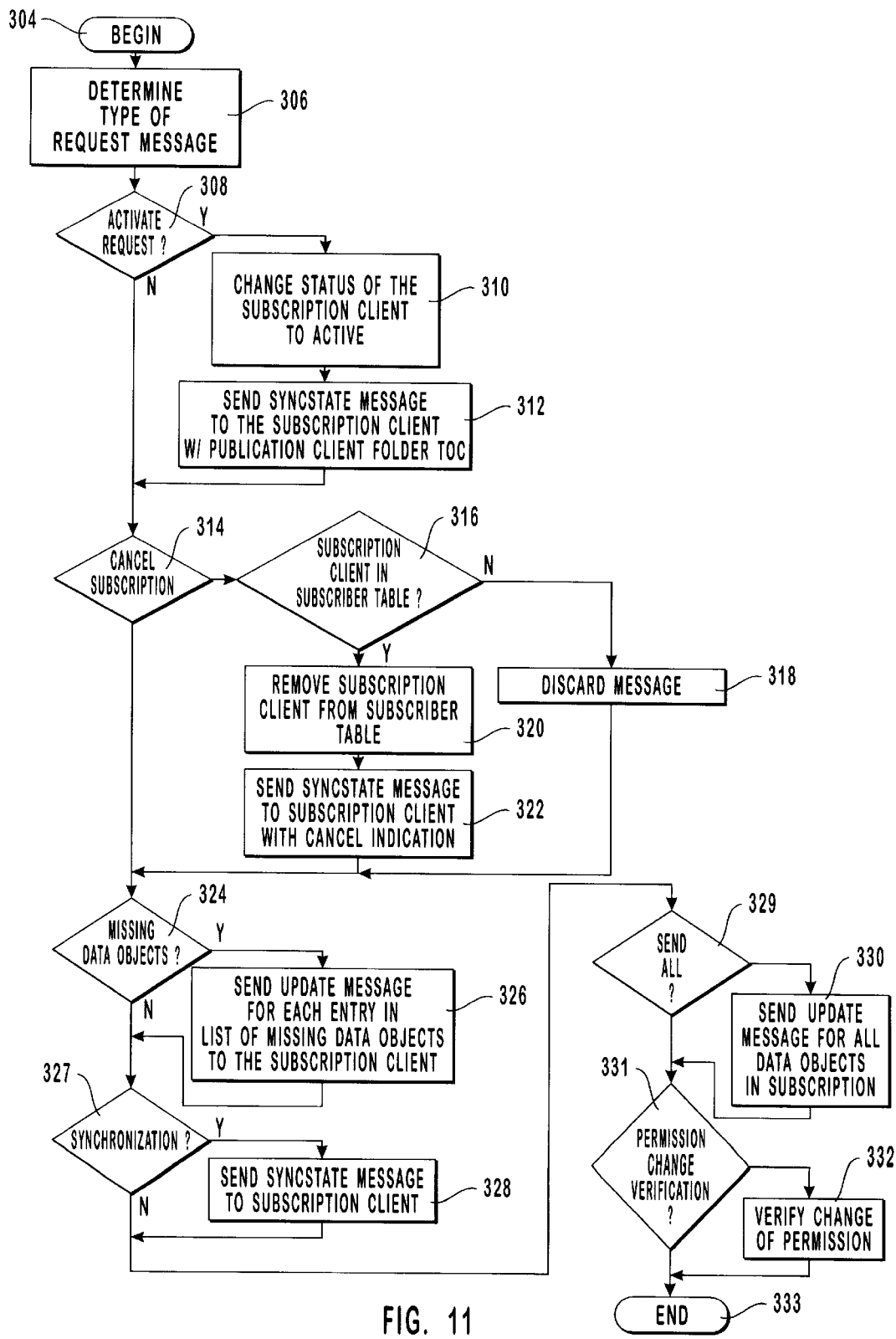
FIG. 11 is a flow chart showing the processing steps taken in order for a publication client to process a request message received from a subscription client.

Referring now to FIG. 11, the processing steps taken by a publication client to process a request message received from a subscription client is shown. After beginning at step 304, the type of request message is determined at step 306 by examining the request-type property of the request message.

If this is a subscription activation request as determined at step 308, the status of the subscription client in the subscription client table data structure will be changed to active from pending at step 310. Note that an activation request will be received in response to a new subscription message sent to the particular subscription client so that the subscription client table will already be aware of a pending offer for subscription.

The publication client will then send a syncstate message to the subscription client containing the publication folder TOC at step 312. With this information, the subscription client will be able to request all of the data objects from the publication folder so that the subscription folder can be made to mirror the contents of the publication folder. The client side processing of a syncstate message will be explained in more detail hereafter in connection with the discussion surrounding FIG. 17.

If the request type is determined to be one that cancels a subscription as determined at step 314, then a further determination is made at step 316 to verify whether the subscription client exists in the subscription client table. This secondary determination needs to be made since either the publication client or the subscription client may cancel a subscription. If the publication client is the originator of the cancellation, then the subscription client will be removed from the subscription client table at this point in processing. In that case, there will be no subscription client in the subscription client table as determined at step 316, and the message will simply be discarded in step 318.

If the subscription client has initiated the cancellation, then the publication client will still have the subscription client information in the subscription client table. This will be determined at step 316. For this situation, the subscription client is removed from the subscription client table at step 320. Next, a syncstate message is sent to the subscription client with a cancellation indication in step 322 so that the subscription client may become fully unsubscribed to the subscription. Note that the syncstate message having the subscription cancellation indication is processed by the subscription client as described in the discussion surrounding FIG. 17 hereafter.

If the request type indicates that a list of missing messages is attached as determined at step 324, publication client will process the missing messages property and send an update message for each entry number in the list of missing messages at step 326 for the pertinent publication.

In some implementations, an efficiency may be attained by sending a single message having multiple data objects attached thereto representing each data object indicated in the list of missing messages. Furthermore, it may also be advantageous to duplicate the message properties as an attachment to the message that would allow a different, and sometimes more efficient, mechanism for accessing the property values.

Should the request type of the request message be a synchronization request as determined at step 327, a syncstate message is sent to the subscription client at step 328 that will include the publication folder TOC. Note that the appropriate subscription client is identified from the subscription client ID of the request message and the correct publication folder is indicated from the publication ID of the request message. With the subscription client ID, the email address and other pertinent information may be found in the subscription client table.

Should the request type of the request message be a send all data objects request as determined at step 329, a separate update message is sent to the subscription client for each and every data object in the subscription at step 330. This allows a subscription client that is just getting initialized to request all data objects with a single request message.

Should the request type of the request message be a permission change verification as determined at step 331, the publication client verifies that the change of permission happened properly at the subscription client. This is part of the architecture that requires a "round trip" back to the publication client before the action is completed. Finally, request message processing ends at step 333, and the processing steps shown in FIG. 11 represent the detailed description of the processing steps found in step 250 of FIG. 9.

Figure 12:
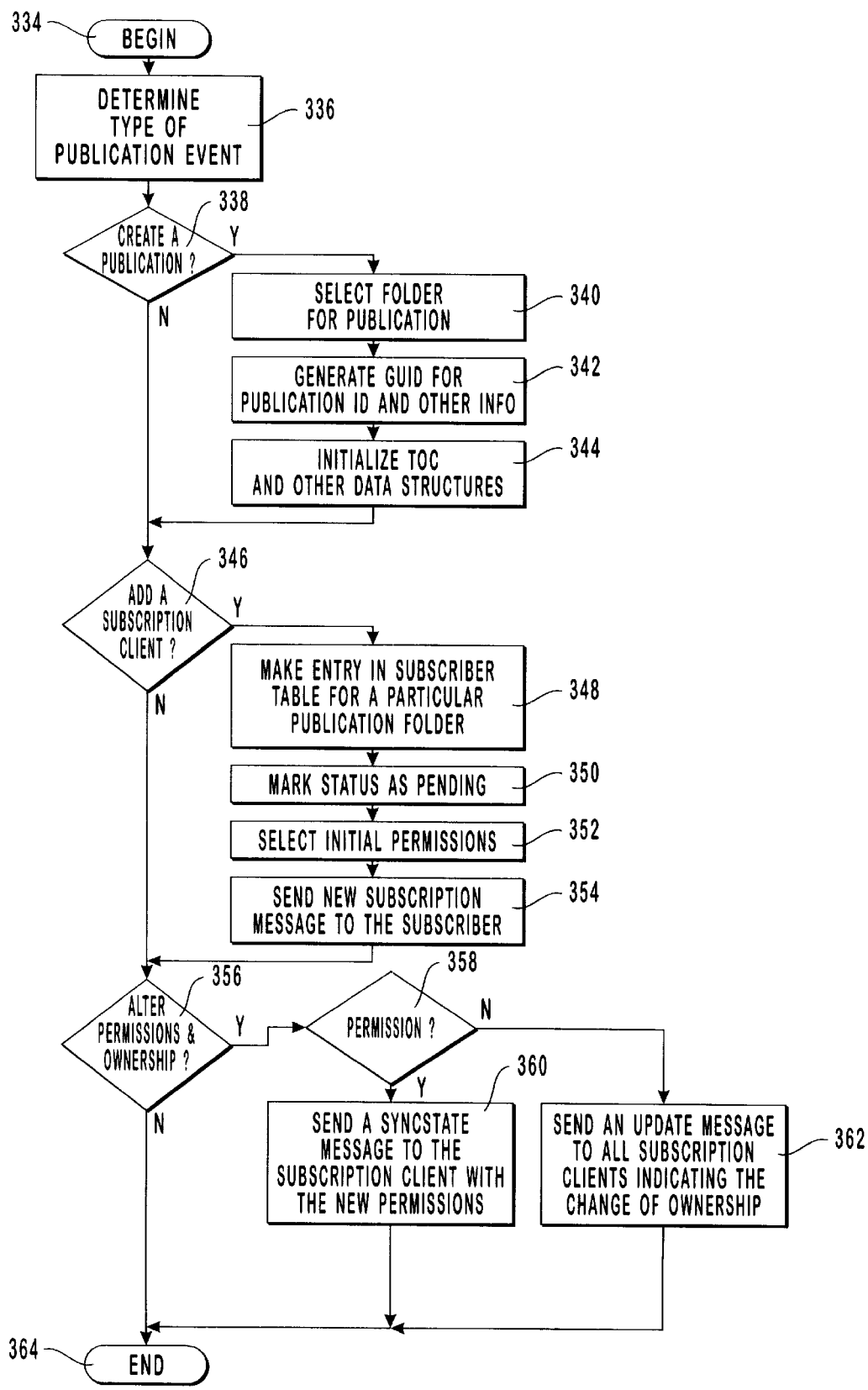
FIG. 12 is a flow chart showing the processing steps taken by a publication client when processing an internal folder publication event such as the addition of a new subscription client to the publication.

Referring now to FIG. 12, the processing of differing publication client events is shown. After beginning at step 334, the type of publication client event is determined at step 336. This determination is made through the publication client code and may be triggered by operation of the user interface by a user that is operating the publication client or some other internal publication client condition.

If the type of publication event is determined to be the creation of a new publication at step 338, then a folder containing data objects is selected for publication at step 340 through the user interface of the publication client. Typically, an existing personal store folder would be selected having messages and other data objects that a user desires to share with other users.

Next, a GUID is generated to identify the publication as a publication ID at step 342. The GUID or publication ID will be used to reference the selected publication folder and all underlying data objects when communicating between publication clients and subscription clients or when accessing the different data structures, such as the map table, subscription client table, and submission table.

Finally, a TOC data structure is created and placed in a message that resides in the publication folder at step 344. Also, other data structures are initialized with the new publication information at step 344, such as a new entry in the map table identifying the folder with the publication ID.

If the type of publication event is adding a new subscription client as determined at step 346, an entry is made in the subscription client table for a particular subscription client and publication folder at step 348. In other words, a subscription client and a publication folder as identified by a subscription client ID and a publication folder ID are entered together in the subscription client table. The email address of the subscription client is also specified so that messages may be sent using the store and forward transport, such as messages conforming to the RFC 822 specification over the Internet.

Next, the status of the subscription client is marked as 'pending' until the subscription client returns a request message activating the subscription. This way, the particular subscription client has ultimate control over whether or not it receives messages pertaining to a given publication.

Also, the initial permissions that a subscription client will have are determined and set at step 352. The publisher (i. e., the user operating the publication client) will determine which of the roles/permissions listed in Table 1 a subscription client will be assigned.

Finally, a new subscription message is sent to the designated subscription client at step 354. The subscription client side processing of a new subscription message will be explained in more detail hereafter in connection with the discussion surrounding FIG. 15.

Should the type of publication event be determined to be an alteration of permissions for a subscription client or ownership of a particular data object as determined at step 356, then different paths are taken depending on whether or not a permission change is involved. If permission changes are involved as determined at step 358, a syncstate message is sent to the subscription client at step 360 containing the new permissions for that client. In this manner, the client may update its own internal information so that it may do permission checking at the subscription client before erroneously submitting an update to a publication client.

Should alteration of ownership for a particular data object be involved as determined at step 358, the publication client will send an update message to each of the subscription clients for a particular publication folder indicating the change of ownership for the particular data object. Again, this feature need not be implemented in order to have a system in conformance with the present invention and may be viewed as optional. This information will be used by each subscription client to update the subscription folder TOC to indicate the change in ownership for the particular data object. The subscription client side change of ownership processing is handled as part of the processing of an update message and is explained in more detail hereafter in the discussion surrounding FIG. 16. Finally, the processing of a publication event ends at step 364. Note that the processing steps shown in FIG. 12 represent the detailed description of the processing steps found in step 254 of FIG. 9.

Figures 13A, 13B:
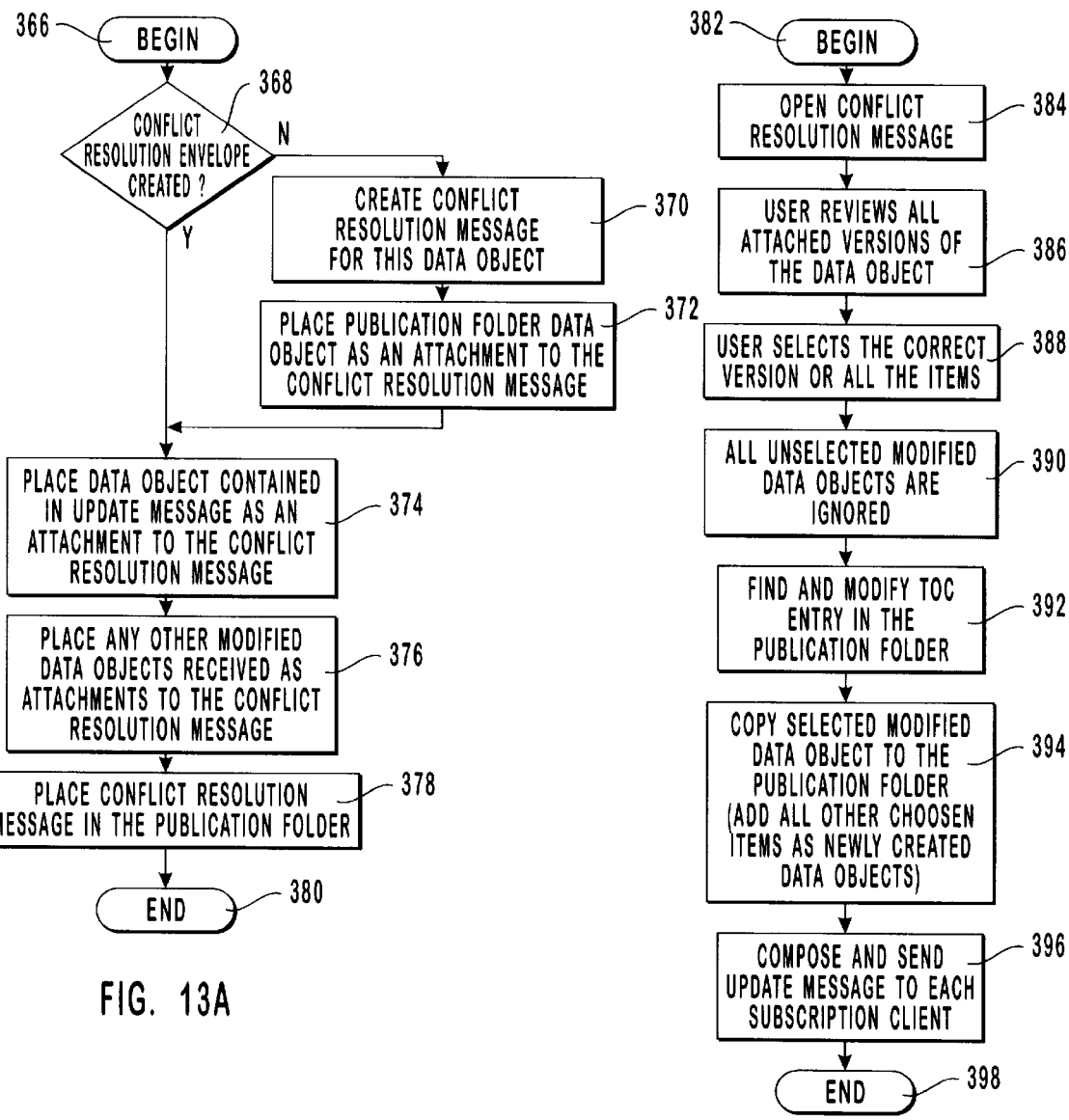
FIGS. 13A and 13B are flow charts illustrating processing steps taken by the publication client in order to resolve conflicts when multiple updates arrive for the same version of a particular data object.

Referring now to FIG. 13A, the processing steps for processing a conflict when a conflict is detected during update message processing by the publication client is shown. Initially, the processing begins at step 366 and it is determined whether a conflict resolution envelope has been created for the particular data object to the update message at step 368. If a conflict resolution envelope has not been created as determined at step 368, a data message that will include as attachments the current version of the conflicting data object as found in the publication folder and all other data objects that conflict with that version as they are received by the publication client during update message processing. The conflict resolution message will be placed in the publication folder of the publication client for resolution by the publisher.

Eventually, as explained hereafter during the discussion surrounding FIG. 13B, the user of the publication client will open the conflict resolution envelope message and choose between the different versions of the attached data object in order to resolve the conflict. A conflict is detected when the version number of an update message having an attached data object is not equal to the version of the data object in the publication folder as explained previously.

At step 370, a conflict resolution message is created for the particular data object attached to the update message. Next, the data object as found in the publication folder is attached to the newly created conflict resolution message at step 372. Note that if a conflict resolution envelope has been previously created as determined at step 368 the processing taken in steps 370 and 372 need not occur.

At step 374, the data object contained in the update message is copied as an attachment to the conflict resolution message. At this point, there are at least two messages in the conflict resolution envelope that will need to be resolved. At step 376, any other editions of the data object that have been received or are otherwise received are also attached to the conflict resolution message at step 376. In this manner, the conflict resolution envelope will have at least two editions of a data object but may have more than two editions of a particular data object. The adding of the editions occurs as more update messages containing the conflicted data object are received and processed prior to the publisher resolving the conflict as explained hereafter.

Finally, the conflict resolution message with the two or more additions of a particular data object attached therewith is placed at step 378 in the publisher's publication folder before ending the processing sequence at step 380. Note that because the publication client is "sending" the message to itself by placing the message in the publication folder, it has the ability to add further editions of a conflicting data object as they are received in forthcoming update message processing by retrieving the message if it hasn't been processed. In this manner, if the conflict resolution envelope has been created as determined at step 368, and the user has not resolved the conflict as explained in the discussions surrounding FIG. 13B, then the message may be accessed in the publication folder and additional attachments representing other editions of the particular data object can be made thereto and the message would be left in the publication folder at step 378. Note that this is simply one example of conflict detection and notification, and those skilled in the art may use others that would remain in harmony with the present invention.

The conflict detection and notification processing ends at step 380 where normal publication client update message processing continues. Note that the processing steps shown in FIG. 13A represent the detailed description of the processing steps found in step 282 of FIG. 10.

Refering now to FIG. 13B, the processing steps taken by the publication client as operated by a user (e.g., the publisher) to resolve the conflict are shown. After beginning at step 382, the publisher causes the conflict resolution message to be opened at step 384. The user will then review all attached editions of the data object at step 386 in order to determine which of the conflicting data objects should be placed into the publication folder and be distributed out to each of the subscription clients. Part of the review process may include editing one of the editions of the data object to consolidate the revisions made in one or more of the other attached editions of the data object. This allows all the individual revisions to be in a single data object. This would be beneficial if a paper had been distributed out to different subscription clients and each had made different editing changes that would be desirable to have in the paper.

At step 388, the user selects the correct edition of the data object amongst the attached editions of the data object and all the unselected data objects are then ignored at step 390. Alternatively, some implementations may choose to simply delete unselected data objects. Furthermore, all of the items in the conflict resolution envelope may be chosen for inclusion. Those skilled in the art will note that any number may be chosen for inclusion in the publication according depending on the system implementation and all such variations are contemplated within the scope of the present invention.

The TOC for the publication folder is modified by finding the entry corresponding to the data object and incrementing the version number at step 392. Finally, the selected data object is copied into the publication folder and replaces whatever version of the data object was there previously if only one was selected. If multiple or all data objects were selected, then the extra ones are added into the publication with a create message as newly created data objects for the publication. At this point, the publication folder has the latest version of the data object that incorporates the resolution of the conflicting data objects as determined by the user of the publication client.

Finally, an update message is sent to each subscription client at step 396 before ending at step 398. Note that the processing steps shown in FIG. 13B represent the detailed description of the processing steps found in step 262 of FIG. 9. After each subscription client processes the update message, each subscription folder will be up-to-date with the publication folder. The subscription client side update message processing by a subscription client as will be explained hereafter in more detail in the discussion surrounding FIG. 16.

Figure 14:
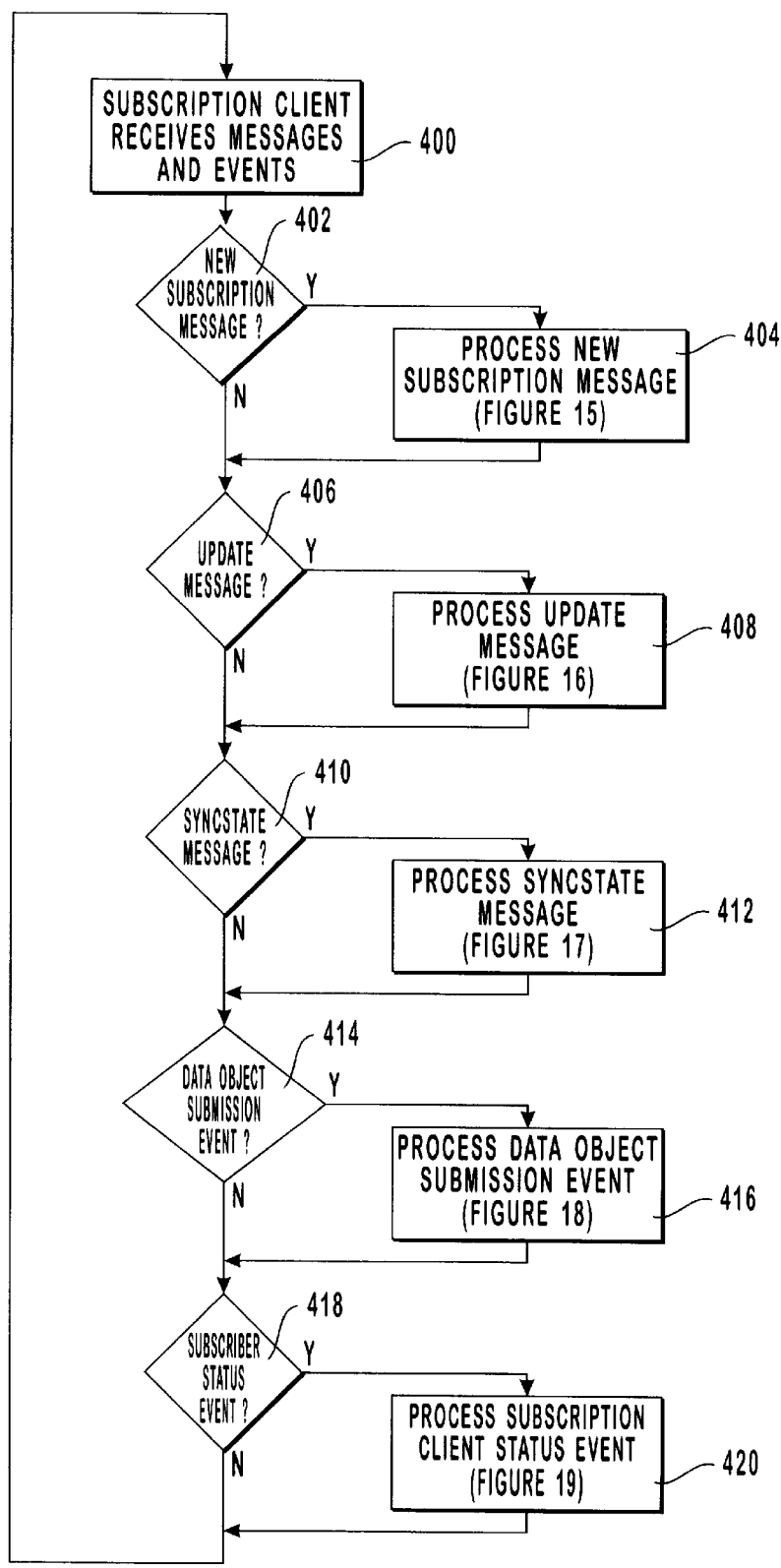
FIG. 14 is a high-level flow chart of the processing steps taken by a subscription client as it receives messages from a publication client and processes relevant internal status events.

Referring now to FIG. 14, a flow chart illustrating the high-level steps taken by a subscription client in processing messages received from a publication client and internal events is shown. The subscription client may be a processing thread that monitors the folder publishing inbox for messages sent to that subscription client. The subscription client receives messages and events at step 400 and should a new subscription message be detected at step 402, the subscription client will process the new subscription message at step 404. The details of the processing of a new subscription message will be explained in more detail in connection with discussion surrounding FIG. 15 hereafter.

A new subscription message is typically received in the normal inbox of a client able to receive messages over the store and forward transport as a standard email message that the user will read in order to determine whether or not to accept the invitation to the publication. Ideally, the client will be compliant with the publication/subscription protocol and be able to respond accordingly.

If an update message is detected at step 406, the subscription client will process the update message at step 408, which will be explained in more detail during the discussion surrounding FIG. 16 hereafter. Update messages typically will contain the data objects to be placed into a subscription folder as they are updated at the publication client and distributed outward to the various subscription clients for placement into the subscription folders.

If a synchronization state or syncstate message is detected at step 410, then syncstate message processing occurs at step 412 and will be explained in more detail during the discussion of FIG. 17 hereafter. Syncstate messages are useful for detecting anomalies in the current state of the subscription folder so that missing or out-of-date data objects may be requested from the publication client.

If a data object submission event is detected at step 414, the data object submission processing occurs at step 416 and will be explained in greater detail during the discussion of FIG. 18 hereafter. A data object submission event may be triggered by a user using the user interface or in some other fashion so that it is desirable to send a data object to the publication client.

At step 418, a subscription client status event may be detected. If so, the processing of the subscription client status event occurs at step 420 and will be explained in detail during the discussion of FIG. 19 hereafter. A subscription client status event would be such things as a user desiring to cancel the subscription or if the subscription client discovers a suspicious state in the subscription folder.

Figure 15:
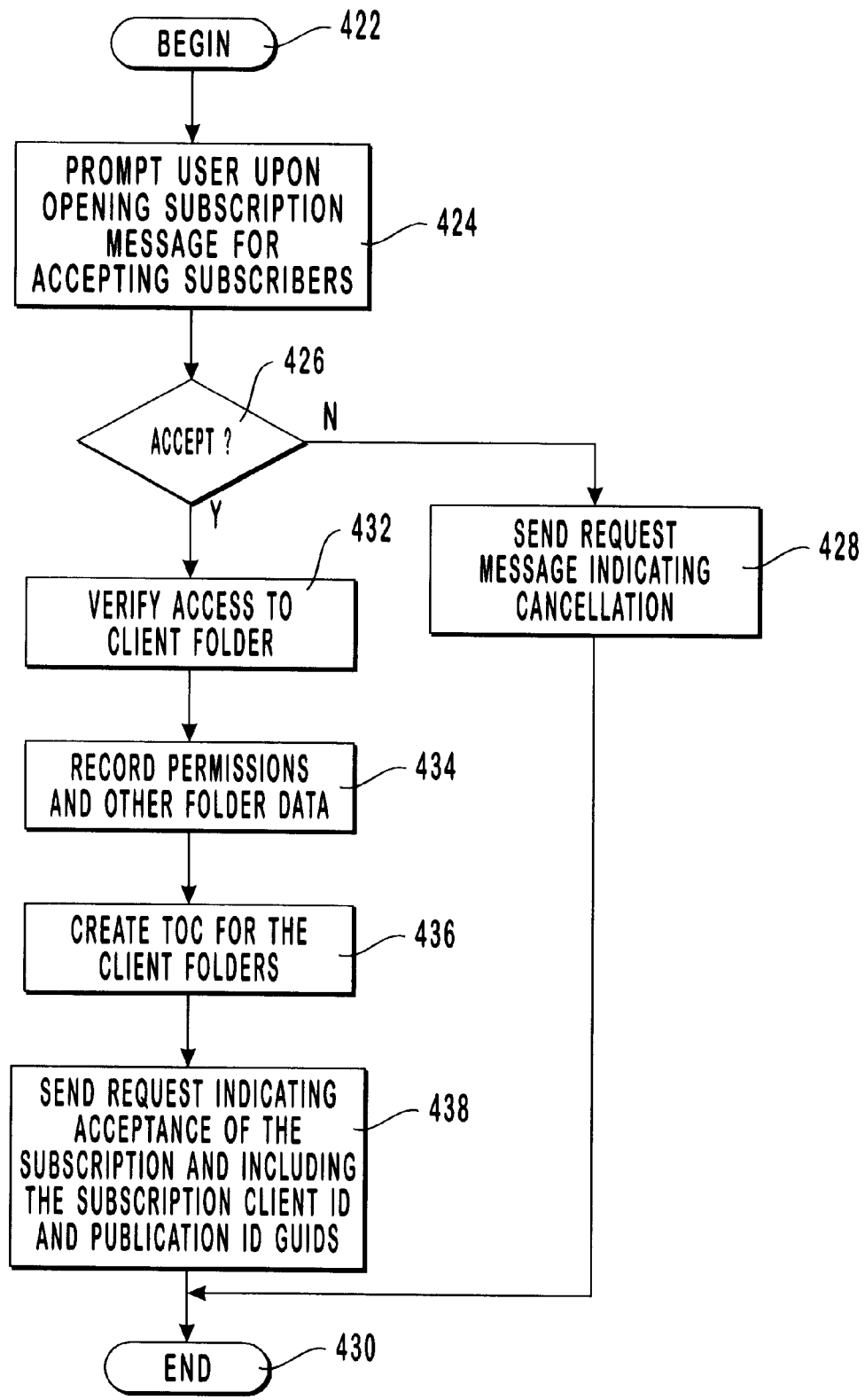
FIG. 15 is a flow chart illustrating the processing steps taken by a subscription client when processing a new subscription message received from a publication client.

Referring now to FIG. 15, the processing steps taken by a subscription client when a new subscription message received is shown. After beginning at step 422, the user opens the message and there is a prompt for the user at step 424 for indicating acceptance of the subscription offer.

Note that in some implementations a general message is sent to the user's inbox under the assumption that the subscription client software may not yet be installed for a particular client. Acceptance of a subscription would also include initially downloading and running the subscription client software that has been attached to the new subscription message. If the subscription client software already exists at the client, then no downloading need occur and processing may proceed directly.

In either case, the processing illustrated in FIG. 15 is for a compliant subscription client. A non-compliant subscription client will simply receive subscription messages until the publication client manually cancels the non-compliant subscription client from the subscription.

If the user does not accept a subscription as detected at step 426, a request message indicating cancellation is sent to the publication client at step 428 before ending processing at step 430. When the publication client receives the request message indicating cancellation, it will remove the subscription client from the subscription client table managed at the publication client and will no longer send messages to this particular subscription client.

If the user has chosen to accept a subscription as indicated at step 426, access is verified to the indicated client folder at step 32. As part of accepting a subscription, the user will previously have indicated a particular folder as the subscription folder. Before data messages may be placed therein, the existence and access to the designated folder must be verified. This may entail creating the folder if it does not already exist. Next, the map table is updated and permissions are recorded at the client so that the client may do its own permission checking before submitting data objects to a publication client at step 434.

At step 436, a TOC is created for the subscription folder and placed inside a data message stored in the designated subscription folder located in the map table. Since no data objects are currently in the subscription folder, the table will have no entries at this time.

Finally, a request indicating the acceptance of the subscription is sent to the publication client. Returned in this request message will be the subscription client ID and the publication ID (both GUIDS). Both are sent down to the subscription client as properties of the new subscription message and will be used by the publication client for verification of the subscription. Finally, processing will end at step 430 and return to the main processing loop shown in FIG. 14. Note that the processing steps shown in FIG. 15 represent the detailed description of the processing steps found in step 404 of FIG. 14.

Figure 16:
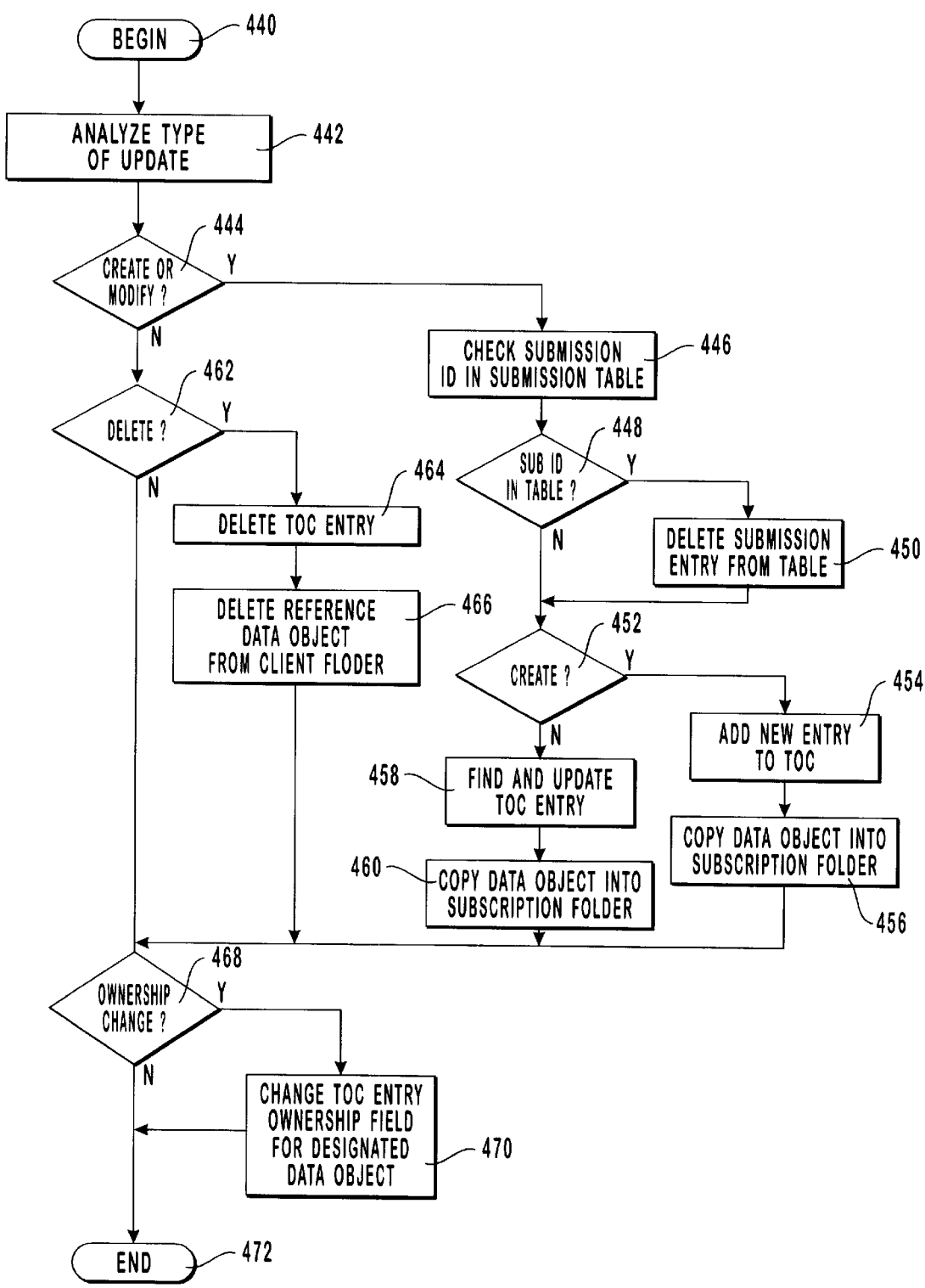
FIG. 16 is a flow chart illustrating the processing steps taken by a subscription client when processing an update message received from a publication.

Referring to FIG. 16, processing steps taken by a subscription client for processing an update message received form a publication client is shown. After beginning at step 440, the type or nature of the update message is analyzed at step 442. This analysis will break the type of an update into either a create update for a new data object to be added into subscription folder, a modify update to replace a data object currently existing in the subscription folder, or a delete update that includes an indication to delete a designated existing data object.

If the update message is determined to be a create or modify update message at step 444, then the submission ID from the update message, if present, is matched with a corresponding submission ID in the submission table at step 446 in order to determine if this particular subscription client had submitted has revised a data object for distribution to all subscription clients. Only one of the many subscription clients receiving the update message will have actually submitted the revised data object.

If it is determined that the submission ID is in the submission table at step 448, the submission entry is deleted from the table at step 450. Submission entries remain in the table so that if a client has submitted an update to the publication client, it may detect if an error has occurred for a submission when processing a syncstate message. Errors occur due to the store and forward transport that may "drop" packets such that the publication client does not receive the update and would therefore require a resubmission of a particular created or revised data object.

At step 452, it is determined whether or not the update message represents a create, meaning a new data object will be added to the subscription folder, or whether it is simply a modify, meaning that the data object will replace an existing data object in the subscription folder. If the update message is determined to be a create at step 452, a new entry is added to the subscription folder TOC at step 454. This new entry will derive its entry number and version number and ownership ID from the corresponding properties found in the update message. Finally, the data object that is attached to the update message is copied into the client subscription folder at step 456. Note that if the subscription client had originally submitted the newly created data object, there is no need to copy the data object into the folder at step 456 in the current embodiment since the data object is already in existence.

If the update message is a modify, as determined at step 452, the TOC entry is found and updated at step 458. This update will require a change in version number. Again, this information comes from the version number property and owner ID property of the update message. Finally, the data object that is attached to the update message is copied into the subscription folder at step 460 replacing the previous version of that data object. Note that if the subscription client had originally submitted the modified data object, there is no need to copy the data object into the folder at step 460 in the current embodiment since the data object is already in existence. As implemented, there is no storage of previous versions of a particular data object, though those skilled in the art will see that retaining past versions may be easily implemented if desired.

One way of handling ownership changes to a data object without a data object modification makes use of the update message without an accompanying data object. Note that this is an optional feature that is within the scope of the invention whether included or not. On some occasions, the ownership of a data object changes without an accompanying modification to the data object itself. Should this occur, the update message will not contain the attached data object, though it will be referenced by the entry number property and publication ID property found in the update message. Should such an ownership change be detected at step 468, the TOC entry for the designated data object is modified at step 470 so that the ownership field is changed using the information from the ownership ID property of the update message. Finally, all processing for the update message ends at 472. Note that the processing steps shown in FIG. 16 represent the detailed description of the processing steps found in step 408 of FIG. 14 and that an ownership change may occur with or without other update message processing.

Referring now to FIG. 17, the processing steps taken by a subscription client for processing an incoming synchronization state or syncstate message from a publication client, is shown. A syncstate message is received from a publication client and contains information regarding the status of the publication folder. This information is typically compared to the information in the subscription state folder in order to detect anomalies so that the subscription client may request necessary information. Furthermore, one or more update messages (and accompanying data object attachments) may also be attached to the syncstate message and be processed at a certain point.

Initially, the type of syncstate message is analyzed in step 476 by looking at the syncstate flags property of the syncstate message. A subscription cancellation can be determined by analyzing the subscription state property of the syncstate message in order to determine whether the subscription client is currently considered inactive. If a publication cancellation syncstate message is determined at step 478, the subscription client will next determine whether the subscription client or the publication client initiated the cancellation at step 480. A client that has initiated a cancellation of a publication will previously have sent a request message to the publication client requesting the cancellation based on a user operating the user interface and the internal state of the subscription client will be marked as inactive so that update message processing can be ignored. Therefore, subscription initiated cancellations can be detected at step 480 by reference to the internal state of the subscription client. Generation of a subscription client initiated cancellation is explained in more detail hereafter in the discussion surrounding FIG. 19.

If the cancellation was subscription client initiated as determined at step 480, all subscription information is removed from the subscription folder at step 482. This would require deleting the data message in the subscription folder containing the subscription folder TOC, removing any objects in the submission table referring to the publication, and removing the reference in the map table identifying the particular folder with the publication. The data objects in the subscription folder are left intact and the user may delete those as desired. Note that some implementations may desire to automatically delete the subscription folder and all data objects contained therein. At this point, both the publication client and the subscription client is fully unsubscribed to the subscription.

If the subscription cancellation is not initiated by the subscription client as determined in step 480 but rather the publication client, the removal of all subscription information occurs at step 486. This will occur in the same manner as explained previously. Finally, a request message with a cancellation indication is sent at step 488 from the subscription client to the publication client in order to finalize the cancellation on the publication client. Processing of the request message by the publication client was explained previously in more detail surrounding the discussion of FIG. 11. At this point, the subscription client is fully unsubscribed to the subscription but the publication client will yet need to process the request message sent at step 488. Processing will then end at step 484 for the subscription cancellation scenario.

At step 494, the TOC property is checked to determine if the publication TOC is present in the syncstate message. If the TOC is present as determined at step 494, the entries on the TOC transmitted with the syncstate message are compared with the entries on the subscription folder TOC at step 496. By making this comparison, missing data objects and out-of-date data objects are determined and included in a list of missing data objects at step 498. Furthermore, at step 498, a request message is sent from the subscription client to the publication client having the list of missing data objects. A data object is missing if an entry on the subscription folder TOC not having the entry number found on the syncstate message TOC is found. A data object is out-of-date when the version number on the subscription folder TOC is different from the version number found at the publication folder as represented by the TOC included with the syncstate message.

At step 500, data objects that exist in the subscription folder but not in the publication folder are deleted. Again, this is achieved by comparing the TOC entries found in the subscription TOC with the entries found in the publication TOC that is attached to the syncstate message. The process of deleting excess data objects is achieved by removing the corresponding entries from the subscription folder TOC and erasing the actual data objects in the subscription folder.

Finally, at step 502, each item existing in the submission table is identified by the publication ID and will trigger the sending of an update message having attached thereto the corresponding data object. This occurs since the update, even if previously sent, has not been received or reflected in the publication TOC indicating that it was not received by the subscription client. By resending an update message having the data object, the error of an apparent missing message is corrected.

If it is determined at step 504 that the syncstate message contains a permission change, the permissions for the subscription client are recorded and changed at step 506. this is important so that a subscription client may verify any submission for conformance to the proper permissions at the subscription client level. This verification will be done as part of the submission event processing explained in more detail during the discussion of FIG. 18. After changing the permissions, a request message is sent to the publication client indicating a permission change verification at step 507. The permission change verification is used by the publication client to assure that the permission change was done correctly.

Finally, processing for a syncstate message ends at step 484. Note that if a syncstate message is not a publication cancellation message, as determined in step 478 explained previously, then it may include all of the other elements of processing depending on the nature of the message. In other words, there may or may not be a TOC property representing the publication folder TOC, and there may or may not be a permissions change associated with each syncstate message. The syncstate message processing steps shown in FIG. 17 represent the detailed description of the processing steps found in step 412 of FIG. 14.

Figure 18:
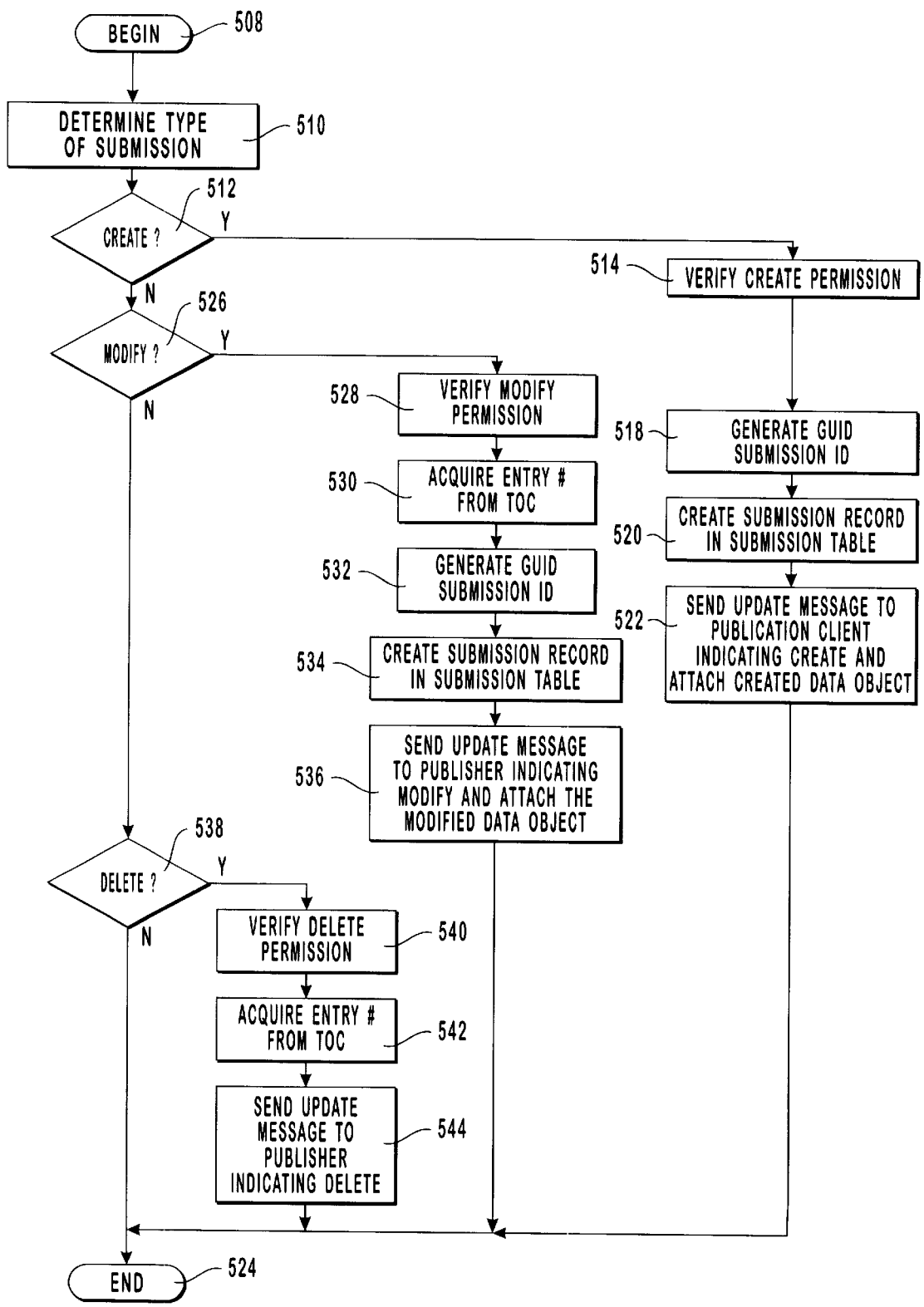
FIG. 18 is a flow chart illustrating the processing steps taken by a subscription client when processing a data object for submission to a publication client.

Referring now to FIG. 18, the processing steps taken by a subscription client to submit a data object to a publication client are shown. Note that the event is typically originated by a user editing a data object in some way, such as creating a new data object, modifying an existing data object, or deleting an existing data object with reference to a particular subscription folder. When the particular editing operation is completed, then the event and accompanying data object (if necessary) are ready for submission to the publication client.

For an edit involving a create situation, the newly created data object is initially stored in the subscription folder and detected by the subscription client. This will cause the item to be automatically propagated to the publication client as a newly created data object with the accompanying modification to the submission table. In like manner, if an existing data object is modified, the data object is changed in the subscription folder, detected by the subscription client, and propagated to the publication client after the appropriate submission table entry has been made. Also, a delete operation works in the same manner with the subscription client detecting that a data object was deleted from the subscription folder, making a submission table entry, and mailing notification of delete to the publication client.

After beginning at step 508, the type of submission event is analyzed at step 510. If it is determined that this is a newly created data object at step 512, the subscription client will initially verify that create permissions exist at step 514 in order to complete the operation. As explained previously, the permissions for a subscription client combined with the ownership of a particular data object determine whether or not an intended operation may be achieved. Should the permission check fail, the subscription client will essentially ignore the submission and the data object will not be propagated. Next, at step 518, a submission ID is generated for this submission (typically a GUID).

Having all the requisite information, a submission record is created and placed in the submission table at step 520. The submission table entry record will contain a reference to the location of the newly created data object should the object need to be resubmitted or otherwise accessed, along with the other information described for a submission table entry described in connection with FIG. 8D previously.

Finally, an update message is sent at step 522 from the subscription client to the publication client having a create indication and the newly created data object attached therewith at step 522. At this point, the create submission is completed and the processing ends at step 524.

Should the type of submission be determined to be a modification of an existing data object at step 526, the permissions for modification are verified at step 528. Assuming that the client is permitted to make a modification, the reference for the particular data object is acquired from the subscription client TOC at step 530. Should the permission check fail, the subscription client will essentially ignore the submission and the data object will not be propagated.

Again, a submission ID is generated at step 532 to identify the submission and a submission record or entry is created in the submission table at step 534. At this point, the subscription client has a complete record of the submission in case a resubmission need take place for a dropped message. Finally, the update message is sent at step 536 from the subscription client to the publication client having a modification indication and the attached modified data object. At this point, the submission is completed and processing ends at step 524.

If the submission event is a deletion of an existing data object as determined at step 538, the subscription client will verify that delete permissions exist at step 540. Again, the permission for deletion may depend both on the permissions given to the particular subscription client as well as the ownership of the particular data object. Should the permission check fail, the subscription client will essentially ignore the submission and the delete indication will not be propagated to all the subscription clients.

Next, the subscription client acquires the entry number for the particular data object from the subscription client TOC at step 542. This allows the data object to be identified and will be used to identify the data object when sent in an update message. Finally, at step 544, an update message indicating a deletion and the entry number is sent from the subscription client to the publication client in order to complete the delete submission event processing before ending at step 524. Note that the submission event processing steps shown in FIG. 18 represent the detailed description of the processing steps found in step 416 of FIG. 14.

Figure 19:
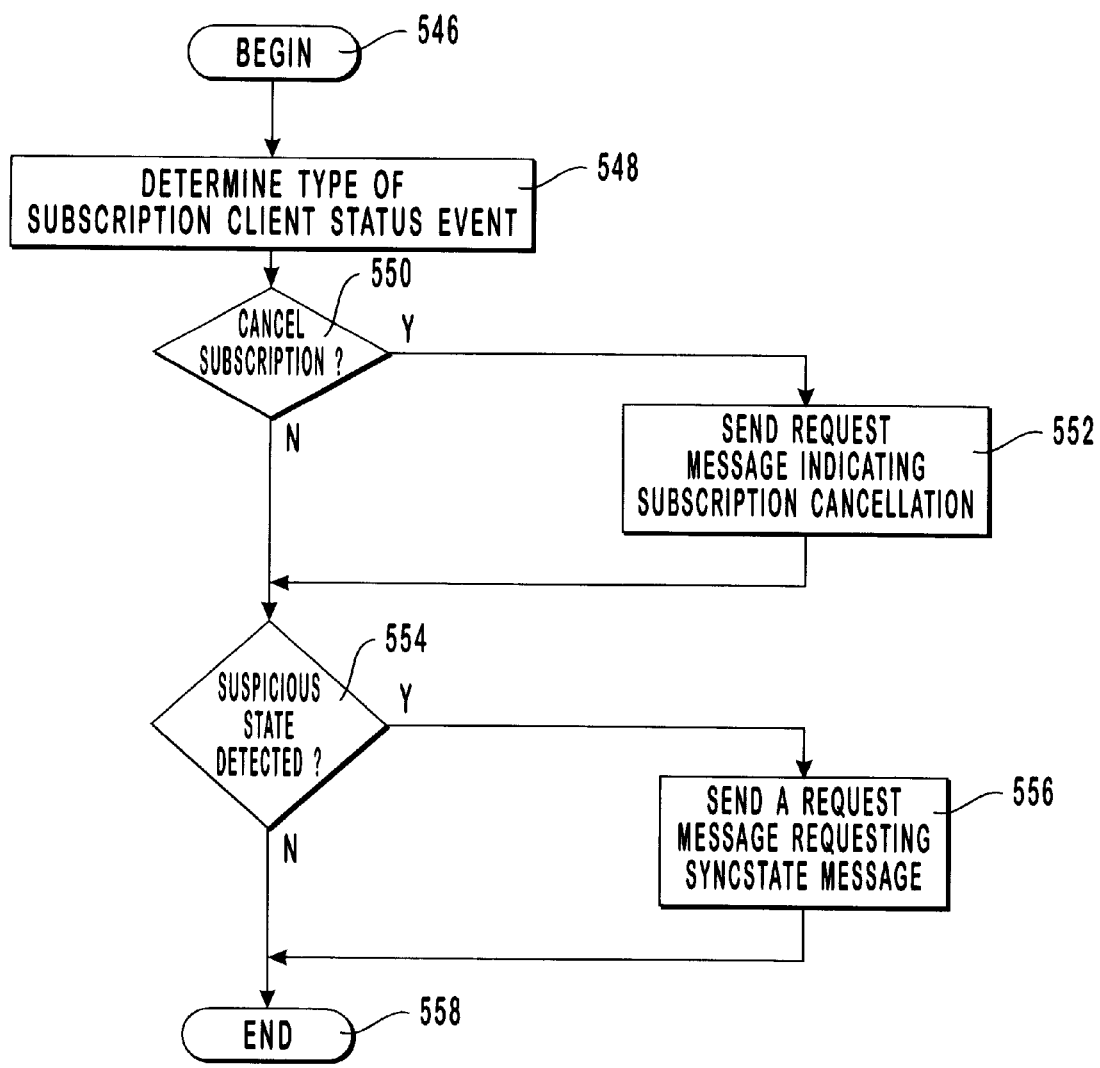
FIG. 19 is a flow chart illustrating the processing steps taken by a subscription client when the subscription client detects unusual events or a user desires to cancel the subscription.

Referring now to FIG. 19, the processing steps taken by a subscription client for processing a subscription client status event is shown. Initially, processing begins at step 546 and the type of subscription client status event is determined at step 548. If the event is a cancellation of the subscription as determined at step 550, the subscription client will send a request message indicating the subscription cancellation to the publication client at step 552. Furthermore, an indication will be maintained that the client had initiated the subscription cancellation in order to properly deal with the subscription cancellation notification that will be received in a forthcoming syncstate message from the publication client. Processing of the actual syncstate message in the subscription cancellation indication has been explained previously in the discussion surrounding FIG. 17.

If a suspicious state is detected at step 554, then the subscription client knows that a synchronization between the publication folder and the subscription folder is needed. Therefore, at step 556, a request message is sent to the publication client from the subscription client requesting that a syncstate message be sent back to the subscription client containing the publication folder TOC. At this point, the processing ends at step 558. Note that the subscription client status event processing steps shown in FIG. 19 represent the detailed description of the processing steps found in step 420 of FIG. 14.

The present invention may be embodied in other specific forms without departing from its spirit or essential characteristics. The described embodiments are to be considered in all respects only as illustrated and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A method for sharing a data object amongst multiple clients and distributing changes made to the data object among the clients comprising the steps of:

publishing the data object to at least one subscription client from a publishing client so that a data object copy resides at each subscription client;

receiving, at the publishing client, changes to the data object from one of the subscription clients over a store and forward transport; and distributing the changes from the publishing client to the clients not aware of the changes so that the data object and data object copies may reflect the changes.

2. A method as recited in claim 1 further comprising the step of sending, periodically from the publishing client to each subscription client, a synchronization message over a store and forward transport containing the current modification status of the data object so that each subscription client may verify that the respective data object copy is up to date with respect to the data object at the publishing client.

3. A method as recited in claim 1 wherein the publishing step comprises the steps of:

sending a subscription invitation message over a store and forward transport to at least one potential subscription client;

receiving a subscription acknowledgment message over a store and forward transport from each potential subscription client desiring to subscribe to the data object; and sending the data object to each acknowledged subscription client over a store and forward transport.

4. A method as recited in claim 1 wherein the publishing step comprises the step of sending at least one message over a store and forward transport having associated therewith the data object to each subscription client.

5. A method as recited in claim 1 wherein the receiving step comprises receiving a store and forward message having associated therewith the modified data object.

6. A method as recited in claim 1 wherein the distributing step comprises sending a store and forward message having associated therewith the modified data object to each of the subscription clients.

7. A method as recited in claim 1 wherein the modified data object is a data object that has been deleted by a subscription client and the receiving step comprises receiving a message over a store and forward transport indicating deletion of the data object, and wherein the distributing step comprises sending a message over a store and forward transport to each subscription client indicating the deletion of the particular data object so that each subscription client may make the corresponding deletion of the respective data object copy.

8. A method as recited in claim 1 wherein the subscription clients have different permissions with respect to the data object.

9. A computer-readable medium having computer-executable instructions for performing the steps recited in claim 1.

10. A method as recited in claim 1, further comprising:

a monitoring, client not aware of the changes, the incoming messages delivered by a store and forward transport for messages from a publishing client, the messages used for maintaining a subscription folder that contains data objects;

transferring the messages from the publishing client to a pending messages folder if the message represents a change in a data object such as the changes to the data object received from one of the subscription clients over the store and forward transport; and processing each message in the pending message folder.

11. A method as recited in claim 10 wherein processing each message comprises:

parsing the message for an attached data object; and if an attached data object is found during parsing, placing the data object into the subscription folder.

12. A method as recited in claim 10 wherein processing each message comprises:

parsing the message for a publisher table of contents comprising a list of data object references, the publisher table of contents corresponding to the subscription folder;

if a publisher table of contents is found during parsing, comparing the list of data object references in the publisher table of contents with the data objects in the subscription folder and based on the comparison performing the following:

deleting data objects from the subscription folder that do not appear on the publisher table of contents list of data object references; and sending a request message to the publishing client for each data object not found in the subscription folder but found on the list of data object references of the publisher table of contents.

13. A method as recited in claim 12 wherein each data object in the subscription folder has associated therewith a version number, the publisher table of contents further comprises a version number for each data object reference, the comparing the list of data object references comprises comparing the data object reference version number with the corresponding subscription folder data object version number, and sending a request message further comprises sending a request message to the publishing client for each data object having a higher version number on the publisher table of contents data object reference than on the subscription folder version number.

14. A method as recited in claim 1, further comprising:
monitoring, at the publishing client, the incoming messages delivered by a store and forward transport for messages from subscription clients, the messages used for maintaining a publication folder that contains data objects;
transferring the messages from the subscription clients to a pending messages folder if the message represents a change in a data object such as the changes to the data object received from the one of the subscription clients over the store and forward transport; and
processing each message in the pending message folder.

15. A method as recited in claim 14 wherein processing each message comprises:
parsing the message for an attached data object; and
if an attached data object is found during parsing, placing the data object into the publication folder and sending an update message to at least one subscription client over a store and forward transport containing the data object as an attachment.

16. A method as recited in claim 14 wherein processing each message comprises:
determining if the message is a request for a particular data object; and
if the message is a request for a particular data object, sending an update message to the subscription client having the particular data object as an attachment.

17. The method in accordance with claim 1, wherein the receiving, at the publishing client, of changes to the data object from one of the subscription clients over a store and forward transport comprises the following:
receiving, at the publishing client, changes to the data object from one of the subscription clients using an RFC 822 Internet message protocol specification.

18. A method for sharing data objects contained in a publication folder amongst multiple clients and distributing changes made to the data objects among the clients comprising the steps of:
publishing, from a publishing client, the publication folder containing the data objects to at least one subscription client where a subscription folder containing the same data objects is maintained;
receiving, at the publishing client, a modified data object corresponding to a data object contained in the publication folder from one of the subscription clients over a store and forward transport;
replacing, in the publication folder, the corresponding data object with the modified data object in the folder; and
distributing the modified data object from the publishing client to every subscription client so that each subscription client may replace the corresponding data object with the modified data object in the subscription folder.

19. A method as recited in claim 12 further comprising the step of periodically sending a store and forward message containing current modification status of each data object contained in the publication folder to every subscription client so that each subscription client may verify that the contents of the respective subscription folder is up to date with respect to the publication folder.

20. A method as recited in claim 12 wherein the publishing step comprises the steps of:
sending a subscription invitation message over a store and forward transport to at least one potential subscription client;
receiving a subscription acknowledgment message over a store and forward transport from each potential subscription client desiring to subscribe to the publication folder and contained data objects; and
sending the data objects contained in the publication folder to each acknowledged subscription client over a store and forward transport.

21. A method as recited in claim 12 wherein the publishing step comprises the step of sending at least one message over a store and forward transport having associated therewith the data objects contained in the publication folder to each subscription client.

22. A method as recited in claim 12 wherein the receiving step comprises receiving a store and forward message having associated therewith the modified data object.

23. A method as recited in claim 12 wherein the distributing step comprises sending a store and forward message having associated therewith the modified data object to each of the subscription clients.

24. A method as recited in claim 12 wherein the modified data object is a data object that has been deleted by a subscription client and the receiving step comprises receiving a message over a store and forward transport indicating deletion of a particular data object, wherein the replacing step comprises deleting the data object from the publication folder, and wherein the distributing step comprises sending a message over a store and forward transport indicating the deletion of the particular data object so that each subscription client may make the corresponding deletion of the particular data object from the respective subscription folder.

25. A method as recited in claim 12 wherein the subscription clients have different permissions with respect to the publication folder and the data objects contained therein.

26. A computer-readable medium having computer-executable instructions for performing the steps recited in claim 12.

27. A computer-readable medium having stored thereon a data structure, comprising:
a plurality of data entries, each data entry corresponding to each client that subscribes to at least one data object stored in a folder, each data entry comprising:
a first data field containing data representing an identification of a subscription client;
a second data field containing data representing an identification of a data object; and
a third data filed containing data representing a permission of how the subscription client identified in the first data filed can act upon the data object identified in the second data field, wherein when the subscription client acts upon the data object, the changes to the data object are transmitted over a store and forward transport to a publishing client which then itself distributes the modified data object over a store and forward transport to the other subscription clients represented by data entries in the plurality of data entries that are not aware of the changes.

28. A computer-readable medium as recited in claim 27, wherein each data entry further comprises a fourth data field represented an electronic mail address of the corresponding subscription client.

29. A computer-readable medium for use in implementing a method for sharing a data object amongst multiple clients and distributing changes made to the data object among the clients, the computer-readable medium having stored thereon computer-executable instructions for performing the following:

causing the data object to be published to at least one subscription client from a publishing client so that a data object copy resides at each subscription client;

detecting the receipt, at the publishing client, of changes to the data object from one of the subscription clients over a store and forward transport; and causing the changes from the publishing client to be distributed to the clients not aware of the changes so that the data object and data object copies may reflect the changes.

30. A method for sharing data objects contained in a publication folder amongst multiple clients and distributing changes made to the data objects among the clients comprising the steps of:

causing the publication folder to be published from a publishing client to at least one subscription client where a subscription folder containing the same data objects is maintained, the publication folder containing the data objects;

detecting the receipt, at the publishing client, of a modified data object corresponding to a data object contained in the publication folder from one of the subscription clients over a store and forward transport;

replacing, in the publication folder, the corresponding data object with the modified data object in the folder; and causing the modified data object to be distributed from the publishing client to every subscription client so that each subscription client may replace the corresponding data object with the modified data object in the subscription folder.

\* \* \* \* \*

UNITED STATES PATENT AND TRADEMARK OFFICE
CERTIFICATE OF CORRECTION

PATENT NO. : 6,324,587 B1
DATED : November 27, 2001
INVENTOR(S) : Brian Trenbeath, Vilayanur Parameswaran Krishnan, William J. Bliss, Siunie Aquawati Sutjahjo, Kevin J. Braun, David R. Dozier and Eric N. Huber It is certified that error appears in the above-identified patent and that said Letters Patent is hereby corrected as shown below:

<u>Column 3,</u>
Line 4, after "implemented today." insert missing paragraph:
-- The data object may be a file containing the current address, phone number, birthdates, etc. for a number of family members living throughout the country. The original publisher may be the grandparents and the subscribers could be each family where one parent is a child to the grandparents. As each family has a child, moves, or otherwise has reason to update the file, there is a need to send the file to the publisher for distribution to each of the subscribers. --

<u>Column 7,</u>
Line 64, before "and the like" change "(ROM)" to -- (ROMs) --

<u>Column 11,</u>
Line 3, after "object" change "I" to -- 1 --

<u>Column 12,</u>
Line 63, before "end user" change "a" to -- an --

<u>Column 14,</u>
Line 8, after "information," change "icluding" to -- including --

<u>Column 24,</u>
Line 57-58, after "according" and before "on the" delete [depending]

<u>Column 26,</u>
Line 55, before "a publication" change "form" to -- from --

<u>Column 27,</u>
Line 1, before "submitted has" delete [had]

<u>Column 31,</u>
Line 32, after "only as" change "illustrated" to -- illustrative --

UNITED STATES PATENT AND TRADEMARK OFFICE
CERTIFICATE OF CORRECTION

PATENT NO. : 6,324,587 B1
DATED : November 27, 2001
INVENTOR(S) : Brian Trenbeath, Vilayanur Parameswaran Krishnan, William J. Bliss, Siunie Aquawati Sutjahjo, Kevin J. Braun, David R. Dozier and Eric N. Huber It is certified that error appears in the above-identified patent and that said Letters Patent is hereby corrected as shown below:

Column 32,
Line 31, before "monitoring" delete [a]
Line 31, before "client" insert -- at a --

Column 33,
Line 66, after "claim" change "12" to -- 18 --

Column 34,
Lines 6 and 18, after "claim" change "12" to --18 --
Lines 23 and 26, after "claim" change "12" to --18 --
Lines 30 and 42, after "claim" change "12" to -- 18 --
Line 47, after "claim" change "12" to -- 18 --

Signed and Sealed this

Thirtieth Day of July, 2002

Attest:

Attesting Officer

JAMES E. ROGAN
Director of the United States Patent and Trademark Office